United States Patent

Serkh et al.

(10) Patent No.: US 8,794,651 B2
(45) Date of Patent: Aug. 5, 2014

(54) BICYCLE PLANETARY GEAR TRANSMISSION ARRANGEMENT

(75) Inventors: Alexander Serkh, Troy, MI (US); Dean Schneider, Washington, MI (US)

(73) Assignee: The Gates Corporation, Denver, CO (US)

( * ) Notice: Subject to any disclaimer, the term of this patent is extended or adjusted under 35 U.S.C. 154(b) by 1095 days.

(21) Appl. No.: 12/798,499

(22) Filed: Apr. 6, 2010

(65) Prior Publication Data

US 2011/0241306 A1 Oct. 6, 2011

(51) Int. Cl.
| | |
|---|---|
| *B62M 1/06* | (2006.01) |
| *F16H 3/70* | (2006.01) |
| *F16H 3/44* | (2006.01) |
| *B62M 11/14* | (2006.01) |
| *F16H 3/66* | (2006.01) |

(52) U.S. Cl.
CPC ...... B62M 11/145 (2013.01); *F16H 2200/2041* (2013.01); *F16H 2200/003* (2013.01); *F16H 2200/2007* (2013.01); F16H 3/663 (2013.01)
USPC ............................ 280/261; 475/276; 475/281

(58) Field of Classification Search
USPC .......... 280/260, 261, 238; 475/276, 277, 278, 475/280, 281, 284, 285, 286, 287, 288, 292, 475/312, 318, 324
See application file for complete search history.

(56) References Cited

U.S. PATENT DOCUMENTS

| | | | | |
|---|---|---|---|---|
| 2,899,030 | A | * | 8/1959 | Douglas et al. ............ 192/217.4 |
| 3,536,171 | A | * | 10/1970 | Bergles ...................... 192/217.4 |
| 4,069,725 | A | | 1/1978 | Segawa |
| 4,817,462 | A | * | 4/1989 | Dach et al. ........................ 475/56 |
| 5,083,991 | A | * | 1/1992 | Yang .............................. 475/259 |
| 5,154,676 | A | | 10/1992 | Kim |
| 5,342,258 | A | * | 8/1994 | Egyed ............................ 475/281 |
| 5,924,950 | A | * | 7/1999 | Pusic ............................. 475/207 |
| 5,964,679 | A | * | 10/1999 | Matsuo et al. ................ 475/297 |
| 6,468,178 | B1 | | 10/2002 | Mohtasham .................. 475/277 |
| 6,533,700 | B2 | | 3/2003 | Shoge ........................... 475/275 |
| 6,729,995 | B1 | | 5/2004 | Bayer ........................... 475/348 |
| 6,852,060 | B1 | * | 2/2005 | Ash ............................... 475/296 |
| 7,192,379 | B2 | | 3/2007 | Steuer et al. .................. 475/297 |
| 7,364,526 | B2 | * | 4/2008 | Cho ............................... 475/279 |
| 2004/0048716 | A1 | * | 3/2004 | Ziemer ......................... 475/286 |
| 2007/0275811 | A1 | * | 11/2007 | Starik ............................ 475/259 |
| 2008/0113845 | A1 | * | 5/2008 | Kamada et al. ............... 475/277 |
| 2009/0023542 | A1 | | 1/2009 | Hino .............................. 475/318 |

FOREIGN PATENT DOCUMENTS

| | | |
|---|---|---|
| EP | 1132287 A2 | 9/2001 |
| GB | 658966 A | 10/1951 |
| GB | 2355772 A | 5/2001 |

OTHER PUBLICATIONS

Shimano; Specification; Nexus 8 Speed Internal Hub; SG-8R36; 1 page.
Rohloff; Planetary Gear Transmission Drawing, 1 page.

* cited by examiner

*Primary Examiner* — Joseph M Rocca
*Assistant Examiner* — Daniel Yeagley
(74) *Attorney, Agent, or Firm* — Jeffrey A. Thurnau, Esq.; Paul N. Dunlap, Esq.

(57) ABSTRACT

A bicycle comprising a frame and at least one wheel attached to the frame, the frame further comprising a receiver, a first planetary gear transmission disposed in the receiver, the wheel having a hub, a second planetary gear transmission disposed in the hub, and an endless member for transmitting a torque trained between the first planetary gear transmission and the second planetary gear transmission.

11 Claims, 23 Drawing Sheets

FIG. 2

| BOTTOM BRACKET TRANSMISSION | | | | REAR HUB TRANSMISSION | | | | |
|---|---|---|---|---|---|---|---|---|
| GEAR | 1 | 1.15 | 1 | 2.30 | .075 | 1 | 1.33 | i | GEAR | |
| 1 | 1 |  | 1 |  | .075 |  |  | 0.75 | 1 |  |
| 2 |  | 1.15 | 1 |  | .075 |  |  | 0.8652 | 2 | 15.36% |
| 3 | 1 |  | 1 |  |  | 1 |  | 1.0000 | 3 | 15.58% |
| 4 |  | 1.15 | 1 |  |  | 1 |  | 1.1536 | 4 | 15.36% |
| 5 | 1 |  | 1 |  |  |  | 1.33 | 1.3300 | 5 | 15.29% |
| 6 |  | 1.15 | 1 |  |  |  | 1.33 | 1.5343 | 6 | 15.36% |
| 7 | 1 |  |  | 2.30 | .075 |  |  | 1.7250 | 7 | 12.43% |
| 8 |  | 1.15 |  | 2.30 | .075 |  |  | 1.9899 | 8 | 15.36% |
| 9 | 1 |  |  | 2.30 |  | 1 |  | 2.3000 | 9 | 15.58% |
| 10 |  | 1.15 |  | 2.30 |  | 1 |  | 2.6532 | 10 | 15.36% |
| 11 | 1 |  |  | 2.30 |  |  | 1.33 | 3.0590 | 11 | 15.29% |
| 12 |  | 1.15 |  | 2.30 |  |  | 1.33 | 3.5288 | 12 | 15.36% |

| Ctr | z6 | z5 | z1 | z2 | z3 | z4 | i |
|---|---|---|---|---|---|---|---|
| 43 | 57 | 60 | 26 | 17 | 14 | 29 | 1.1536 |
| 46 | 59 | 66 | 26 | 20 | 13 | 33 | 2.3000 |

| BOTTOM BRACKET TRANSMISSION | | | | |
|---|---|---|---|---|
| GEAR | BRAKE 1 | BRAKE 2 | CL1 | CL2 |
| 1 | -- | -- | X | X |
| 2 | X | -- | -- | X |
| 3 | -- | -- | X | X |
| 4 | X | -- | -- | X |
| 5 | -- | -- | X | X |
| 6 | X | -- | -- | X |
| 7 | -- | X | X | -- |
| 8 | X | X | -- | -- |
| 9 | -- | X | X | -- |
| 10 | X | X | -- | -- |
| 11 | -- | X | X | -- |
| 12 | X | X | -- | -- |

| | |
|---|---|
| -- | UNLOCKED |
| X | LOCKED |

BICYCLE PLANETARY GEAR TRANSMISSION ARRANGEMENT

FIELD OF THE INVENTION

The invention relates to a planetary gear mechanism for a bicycle, and more particularly to a bicycle having a first planetary gear transmission disposed in a frame and a second planetary gear transmission disposed in a wheel hub.

BACKGROUND OF THE INVENTION

It is known that bicycles may have internal geared transmissions located in rear hubs. For example, the Shimano Company provides a Shimano NeXUS™ eight speed transmission. The transmission comprises an internal geared planetary transmission which is located in a bicycle rear wheel hub. Rohloff GmbH of Germany provides a fourteen speed planetary gear transmission, also for use in a bicycle rear wheel hub.

The prior art transmissions have common disadvantages including heavy weight and that each is located in the bicycle rear wheel hub.

Also representative of the art is U.S. Pat. No. 6,468,178 (2002) to Mohtasham which discloses a rear wheel hub and chainless drive train gear assembly for use on a bicycle having an axle bracket fixed to the frame of the bicycle, a spindle extending axially through the axle bracket and left and right pedal crank arms for rotating the spindle upon application of a pedaling force. A primary drive gear fitted to the spindle drivingly engages carrier gears which operate a planet gear cage housing and a multiple planetary gear and sun gear arrangement according to various gear ratios determined by selective operation of a clutch assembly. Planetary gear groups each include an integral set of planetary gears of varying size which mesh with corresponding sun gear rings. Operation of the clutch assembly serves to selectively engage pawl stops with a corresponding sun gear ring, thereby engaging the corresponding sun gear ring with one of the planetary gears of the planetary gear groups according to a selected gear ratio. The planetary gear groups drive an annular gear ring and an associated annular needle bearing which, in a forward clockwise rotation, engages the hub body to rotate the rear bicycle wheel. Reverse rotation of the annular gear, in a counter-clockwise rotation, results in a freewheeling of the drive train gear assembly relative to the hub body.

Co-pending U.S. non-provisional patent application Ser. No. 12/657,461 filed Jan. 20, 2010 discloses a planetary gear mechanism for a bicycle, and more particularly to a planetary gear mechanism comprising a first planetary mechanism connected coaxially in series to a second planetary mechanism, which second planetary mechanism is connected coaxially in series to a third planetary mechanism, the second planetary mechanism output is a step up in speed from the first planetary mechanism output, the third planetary mechanism output is a step up in speed from the second planetary mechanism output What is needed is a bicycle having a first planetary gear transmission disposed in a frame bottom bracket and a second planetary gear transmission disposed in a wheel hub. The present invention meets this need.

SUMMARY OF THE INVENTION

The primary aspect of the invention is to provide a bicycle having a first planetary gear transmission disposed in a frame bottom bracket and a second planetary gear transmission disposed in a wheel hub.

Other aspects of the invention will be pointed out or made obvious by the following description of the invention and the accompanying drawings.

The invention comprises a bicycle comprising a frame and at least one wheel attached to the frame, the frame further comprising a receiver, a first planetary gear transmission disposed in the receiver, the wheel having a hub, a second planetary gear transmission disposed in the hub, and an endless member for transmitting a torque trained between the first planetary gear transmission and the second planetary gear transmission.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 2 is a table of gear ratios.

FIG. 3 is a table of brake and clutch positions for each gear.

DETAILED DESCRIPTION OF THE PREFERRED EMBODIMENT

Figure 1:
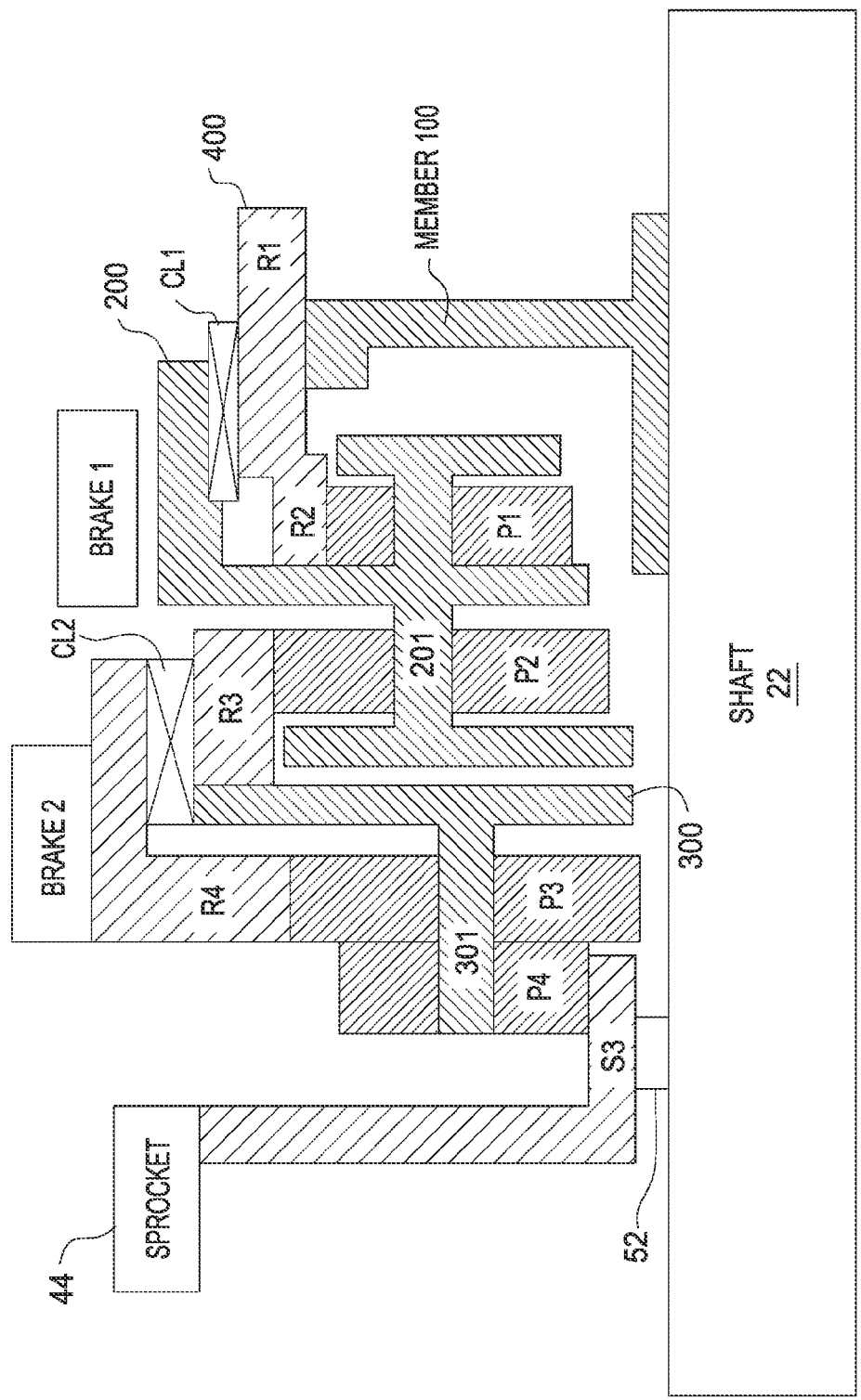
FIG. 1 is a cross-sectional schematic view of the transmission.

FIG. 1 is a cross-sectional schematic view of the transmission. The invention generally comprises a planetary gear transmission disposed in a bicycle bottom bracket. A second planetary gear transmission is located in the rear hub. The bottom bracket transmission comprises four gear ratios. The rear hub transmission comprises three gears.

Figure 4A:
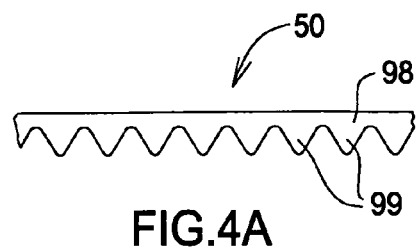
FIG. 4A is a side view of a belt.
Figure 4:
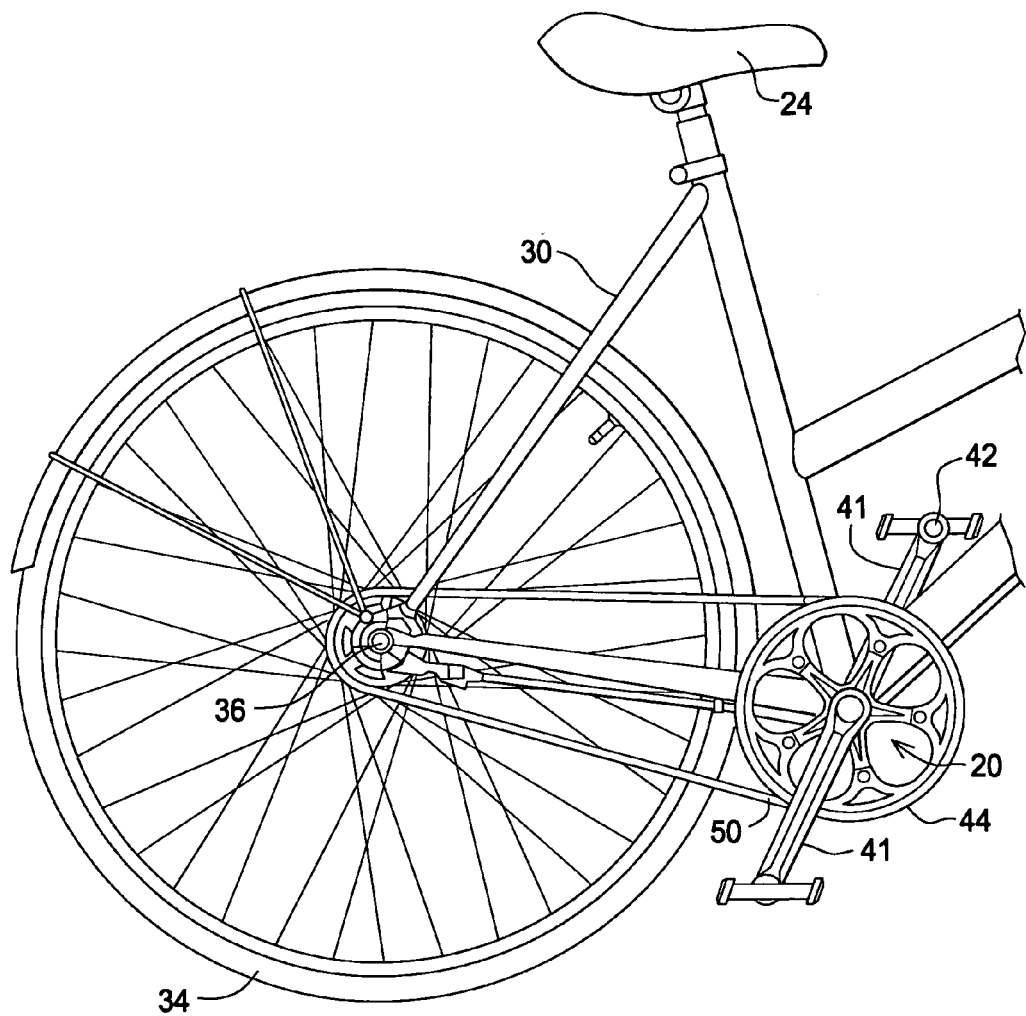
FIG. 4 is a partial side view of a bicycle.

The transmission which is located in a bicycle bottom bracket, see FIG. 4 comprises crank arms (see FIG. 4) which are attached to each end of the input member 22. Member 100 is rigidly connected to the member 22, and thereby rotates with member 22.

Ring gear member 400 comprises a first ring gear R1 and a second ring gear R2. R1 is in meshing connection with member 100. R2 is in meshing engagement pinion P1.

Brake 1 and brake 2 are connected to a bicycle frame (see FIG. 4). The rotational speed of pinion P1 is a function of whether brake 1 or brake 2 is engaged or disengaged, see FIG. 3.

Second planetary mechanism has two pinion gears P1 and P2 fixedly connected to a carrier shaft 201, and therefore gears P1 and P2 rotate together with shaft 201. Ring gear R2 is in meshing engagement with pinion gear P1. Carrier shaft 201 is journalled to carrier 200. Carrier 200 is a reaction member with and is engaged with brake 1.

A third ring gear R3 is fixedly attached to the input member of the third planetary mechanism which is carrier 300. The third planetary mechanism pinion gear P3 is in meshing engagement with fourth ring gear R4. Ring gear R4 is engaged with brake 2 and one-way clutch CL2. One-way clutch CL2 is engaged with carrier 300 and ring gear R3.

Pinion gear P3 and P4 are each journalled to carrier pin 301, and therefore rotate together. Pinion gears P3 and P4 preferably comprise a single gear component having two different diameters and hence define gears P3 and P4. Pinion gear P4 is in meshing engagement with output sun gear S3. Output sun gear S3 is fixedly attached to output sprocket 44.

All planetary carrier mechanisms are numbered as a function of increasing speed of their respective output members, that is, the third planetary mechanism causes rotation of sprocket 44, which in turn rotates faster than the relative rotation of the second planetary mechanism, which in turn rotates faster than the relative rotation of the first planetary mechanism when each planetary mechanism is operating with all one-way clutches (CL1 and CL2) disengaged, see FIG. 3 gear 4. Further, each planetary carrier mechanism is coaxial with the others about shaft 22 and each of the planetary carrier mechanisms are connected in series.

Each planetary mechanism further comprises a one-way clutch, namely, CL1, CL2. When engaged each one-way clutch locks each respective planetary carrier mechanism with a gear ratio of 1:1.

A low-friction bushing 52 is disposed between sun gear S3 and input member 22.

For ease of reference, the following assemblies may also be generally referred to as the first planetary mechanism, second planetary mechanism and third planetary mechanism.

First input portion: member 100 is connected to the shaft 22.
Second planetary mechanism: carrier 200; pinion gears P1, P2; shaft 201; one-way clutch CL1; ring gear R2; ring gear R3.
Third planetary mechanism: carrier 300; pinion gears P3, P4; shaft 301; one-way clutch CL2; ring gear R4.

Hence, the inventive device comprises a bicycle comprising a frame and at least one wheel attached to the frame, the frame further comprising a receiver, a first planetary gear transmission disposed in the receiver, the first planetary gear transmission comprising, an input member (100) connected to a ring gear (R1), the ring gear (400) comprising a ring gear (R1) and a ring gear (R2), ring gear (400) in meshing engagement to a pinion gear (P1), pinion gear (P1) and a pinion gear (P2) journalled to a first carrier (201), the first carrier engaged with a first brake (brake 1), a one-way clutch (CL1) disposed between the first carrier and the ring gear (400), pinion gear (P2) in meshing engagement with a ring gear (R3), ring gear (R3) connected to a second carrier (301), a third pinion (P3) and a fourth pinion (P4) journalled to the second carrier, the third pinion (P3) in meshing engagement with a ring gear (R4), ring gear (R4) engaged with a second brake (brake 2), a second one-way clutch (CL2) disposed between the ring gear (R4) and the ring gear (R3), the fourth pinion (P4) in meshing engagement with an output sprocket (S3), the wheel having a hub, a second planetary gear transmission disposed in the hub, and an endless member for transmitting a torque trained between the first planetary gear transmission output sprocket and the second planetary gear transmission.

FIG. 2 is a table of gear ratios. Planetary mechanism 200 has gear ratios 1 and 1.15. Planetary mechanism 300 has gear ratios 1 and 2.30. The combined overall gear ratio is noted in column i.

The inventive transmission results in very linear steps between each gear ratio averaging approximately 15%. This allows predictable power requirements for each shift as a rider shifts up and down through the gears.

Since the inventive transmission increases the speed of the output member front sprocket 44 compared to the speed of input member 22, the ratio between the front sprocket 44 and a rear sprocket 36 installed on the rear wheel 34 is adjusted accordingly. Hence, for example, front sprocket 44 has 32 teeth and the rear sprocket has 42 teeth. The number of teeth on the front sprocket and rear sprocket may be adjusted as may be required by a user.

For the preferred embodiment, the difference in ratio between the 4 speed transmission in the bottom bracket (20) and the 3 speed rear hub transmission 36 is compensated by reducing the size of the rear sprocket by approximately ×0.75. A 42 tooth sprocket is replaced by a 32 tooth sprocket in the rear. The front sprocket 44 is a 32 tooth sprocket. The belt ratio can be 1:1.

FIG. 3 is a table of brake and clutch positions for each gear. For example, first gear, the slowest gear, has all planetary mechanisms 200, 300 at gear ratio 1:1 and all clutches CL1, CL2 are locked. In first gear all brakes 1, 2 are disengaged.

The inventive transmission is about 20% to 30% lighter than prior art transmissions. Another advantage of the transmission is better clearance in a bicycle frame since front sprocket is much smaller.

The following is provided as an example and is not intended to limit the design parameters which may be used for each component. The diameters are in mm.

| Pinion Gear | Ring Gear | Diameter | No. of Teeth |
| --- | --- | --- | --- |
| P1 | NA | 11.2 | 14 |
| P2 | NA | 13.6 | 17 |
| P3 | NA | 16 | 20 |
| P4 | NA | 10.4 | 13 |
| NA | R1 | 57.6 | 72 |
| NA | R2 | 45.6 | 57 |
| NA | R3 | 48 | 60 |
| NA | R4 | 52.8 | 66 |

FIG. 4 is a partial side view of a bicycle. The inventive transmission will be preferably installed in bottom bracket 20. Crank arms 41 are connected to input member 22. A rider's feet engage pedals 42. A flexible drive member 50 is engaged between front sprocket 44 and rear hub 36. Wheel 34 comprises a rear hub 36. A rider (not shown) sits on seat 24. Wheel 34, crank arms 41, bottom bracket 20, seat 24 are connected to bicycle frame 30, known in the art. Flexible drive member 50 may comprise a belt or chain.

The rear hub 36 may comprise any three speed planetary gear transmission known in the art. For example, a Sturmey Archer three speed hub gear Type S-RF3 is suited for the instant application and is known in the art. Another known suitable rear hub 36 is the Shimano SG-3C41 and the Shimano SG-3R40. Another suitable rear hub transmission includes the SRAM i-Motion™ 3 speed.

FIG. 4A is a side view of a belt. Belt 50 comprises a body 98. Teeth 99 extend from belt body 98. Teeth 99 extend across the width of the belt and normal to a longitudinal or endless direction. This style of belt is also referred to as a toothed, cogged or synchronous belt as is known in the automotive arts.

Figure 5:
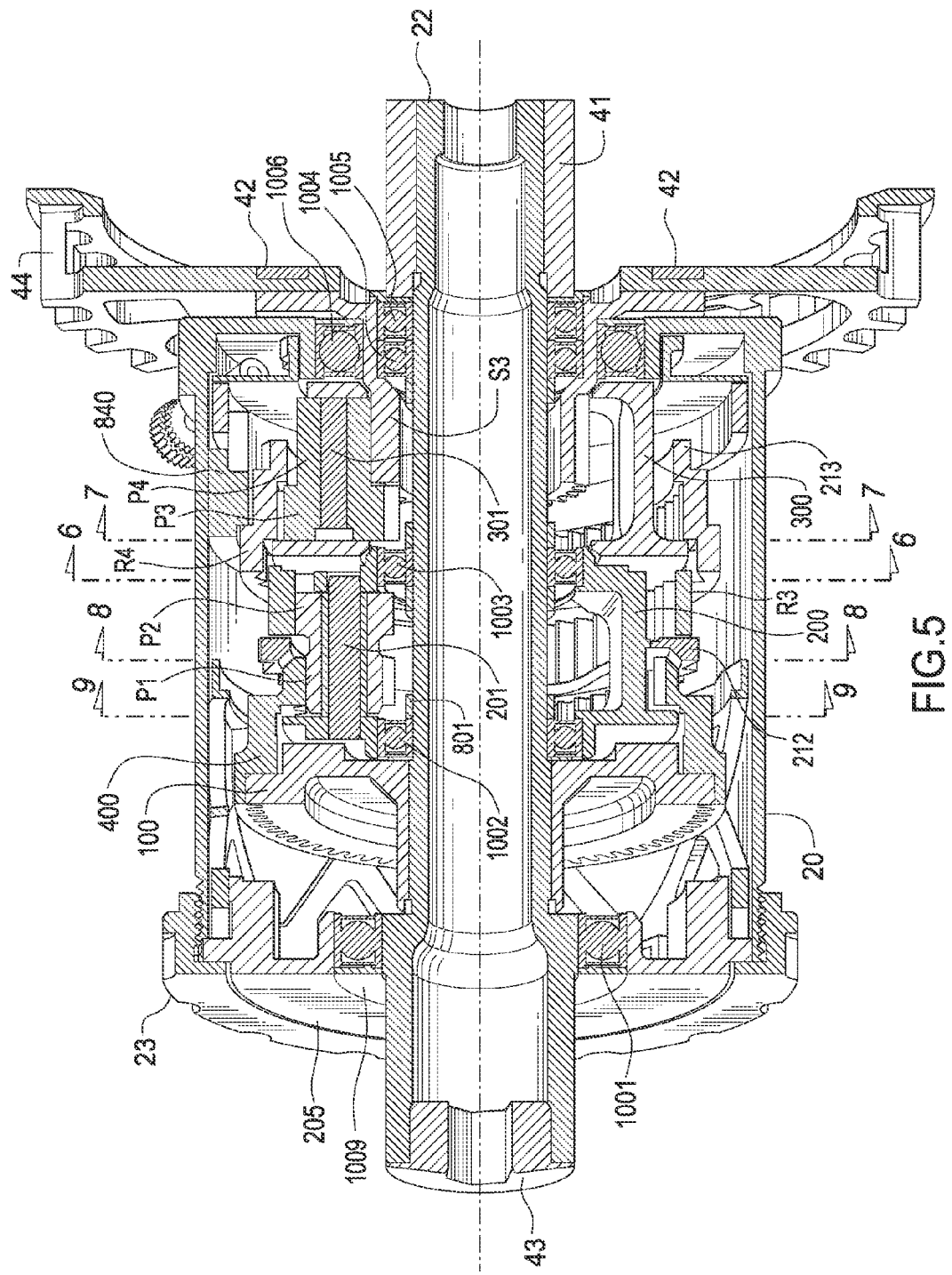
FIG. 5 is a cross-sectional view of the transmission.

FIG. 5 is a cross-sectional view of the transmission. First carrier 200 is shown connected in series within a bottom bracket or a transmission housing 20. Member 100 is fixedly connected to input member 22. Carrier 200 is rotatable about member 22 on bearings 1002, 1003. Second carrier 300 is rotatable about member 22 on bearings 1003, 1004, 1005. Member 22 rotates within bottom bracket 20 22 on bearing 1001. Member 22 may be hollow to reduce weight of the transmission.

Figure 6:
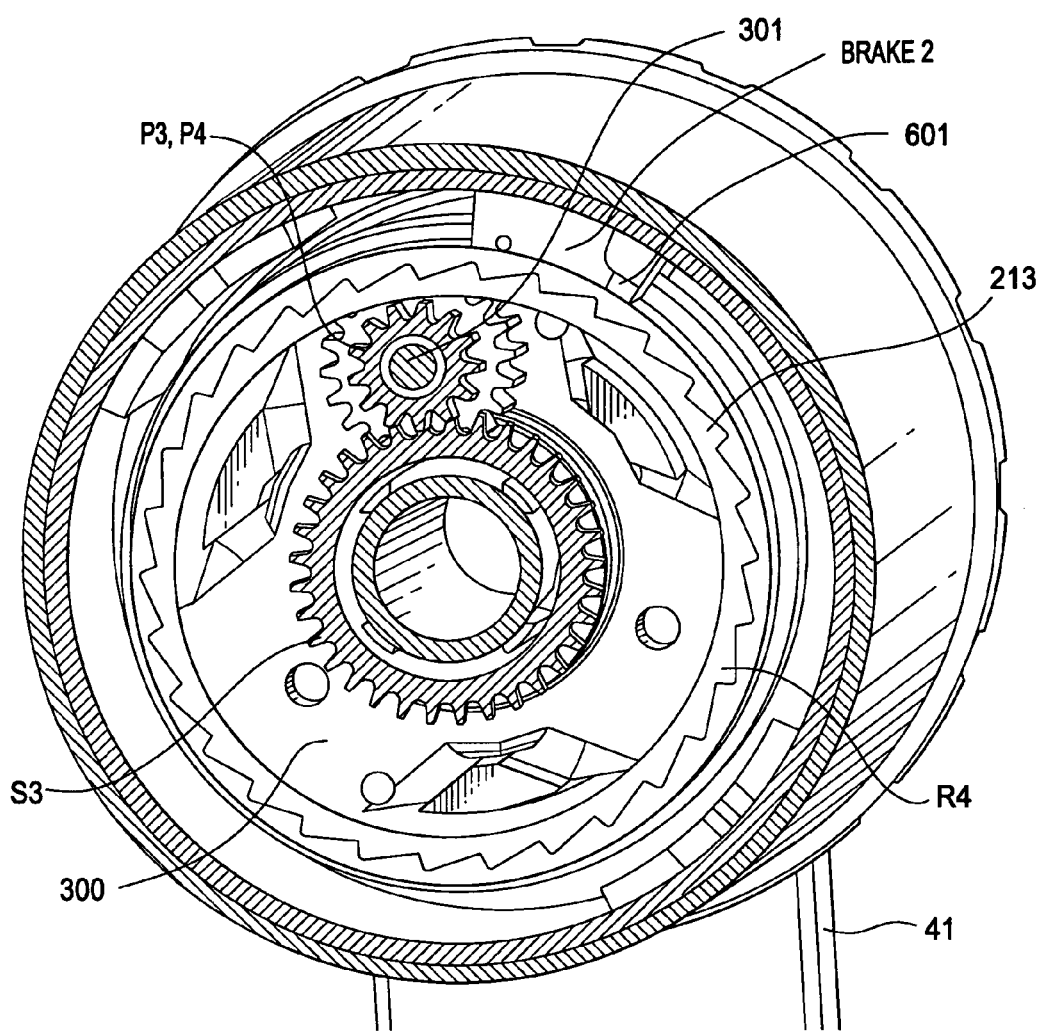
FIG. 6 is a cross-section at 6-6 in FIG. 5.

FIG. 6 is a cross-sectional view at 6-6 in FIG. 5. The figure shows sun gear S3. Brake 2 engages ring gear R4. Pinion P4 has a meshing engagement with sun gear S3.

The brake mechanisms for shifting the planetary transmission ensures that a compound planetary set cannot engage two gear sets at once and thus become locked. The proposed mechanism is located in the proximity of the sun gears of a compound planetary gear set but could easily be applied to breaking or shifting of a compound planetary gear set with multiple ring gears.

The mechanism comprises two levers (721,722) (821,822) configured in a manner such that one physically interferes or prohibits the other lever from engaging its sun gear while the other is engaged with its respective sun gear. When one sun gear is stopped by a brake, the other sun gear will be forced to rotate relative to the stopped sun gear. In the case of a compound set with more than two sun gears, each sun gear will rotate at a different speed than the others. However, if each brake is applied to each sun at the same time the transmission would lock and not rotate. Each lever limits the rotation or stops their respective sun gear by engaging with a stepped area of the sun gear such that the lever engages the face of a step and limits the rotation of the sun in one direction. The mechanism could engage the sun gears from radially outside or radially inside depending on the configuration required.

The shift levers are actuated by a roller 601 that engages a profiled surface 601B. As the profile changes, the levers are moved to either engage as a brake or open and allow free movement of the respective sun gear. Shift cam 600 engages shift rollers 601. Each shift roller 601 engages a compliant pad or member 602.

Figure 7:
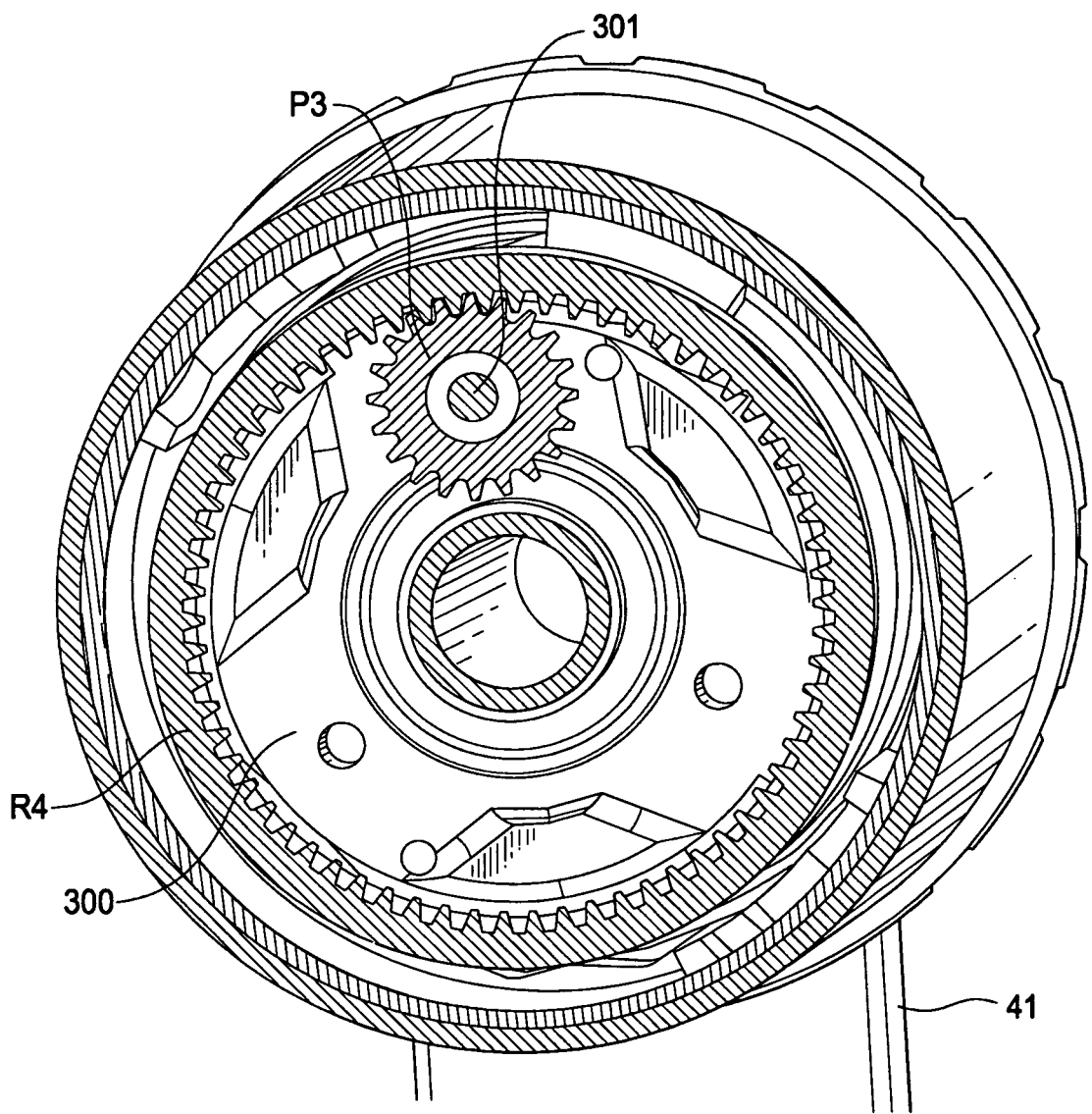
FIG. 7 is a cross-section at 7-7 in FIG. 5.

FIG. 7 is a cross-section at 7-7 in FIG. 5. Pinion gear P3 has a meshing engagement with ring gear R4.

Figure 8:
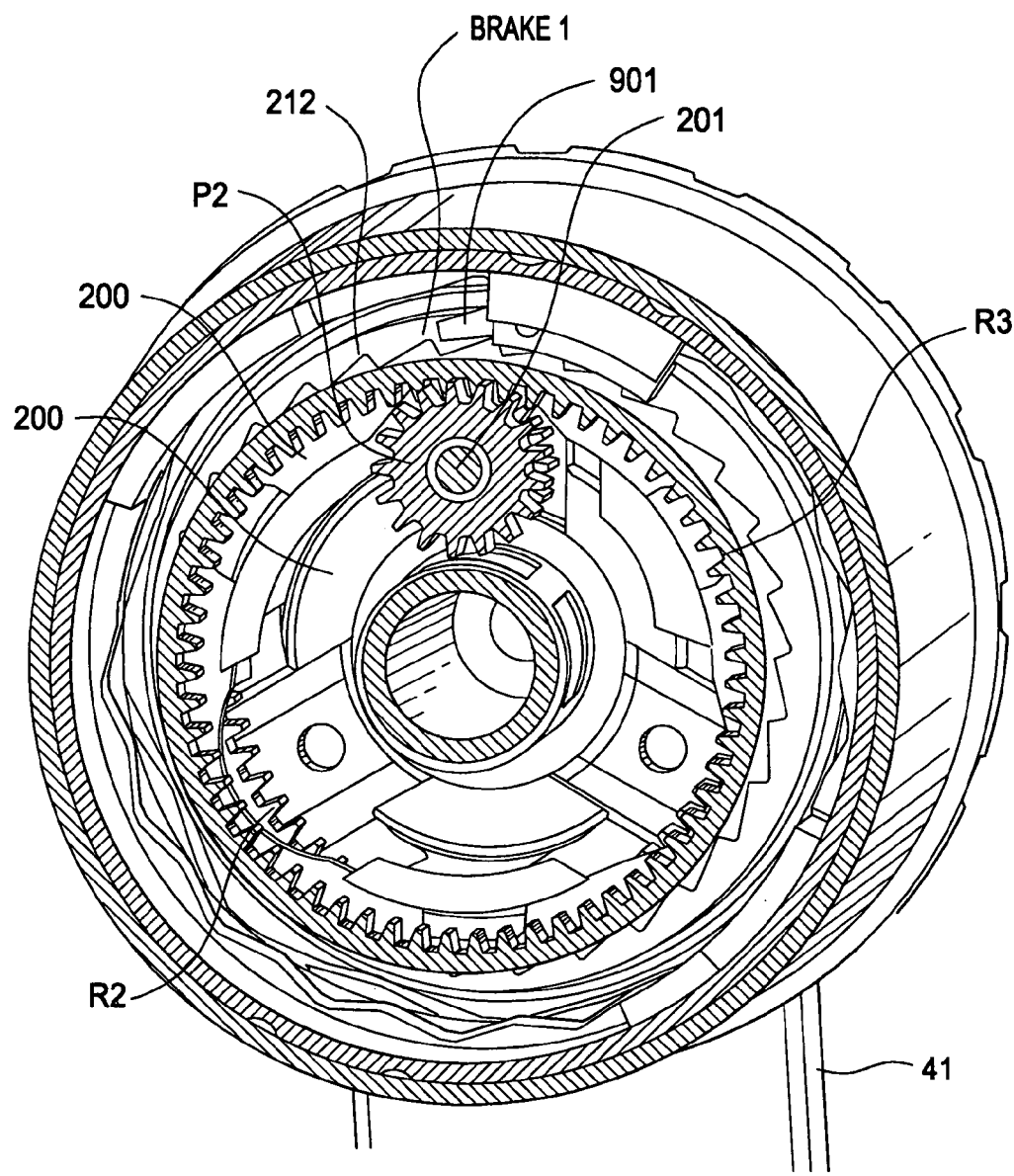
FIG. 8 is a cross-section at 8-8 in FIG. 5.

FIG. 8 is a cross-section at 8-8 in FIG. 5. Pinion gear P2 is journalled to shaft 201. Pinion gear P2 has a meshing engagement with ring gear R3. Brake 1 comprises shift member 901 which engages teeth 212. Teeth 212 are disposed on an outer perimeter of carrier 200.

Figure 9:
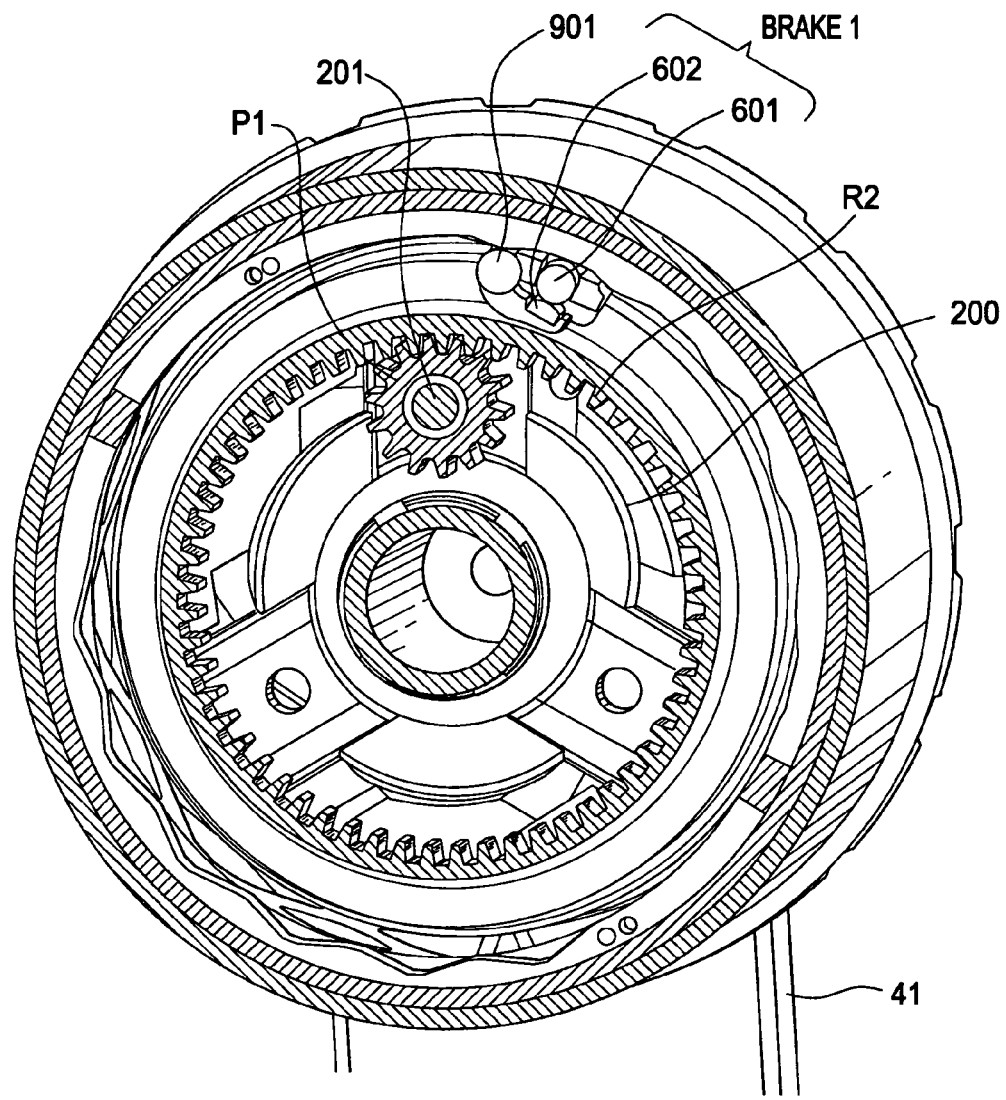
FIG. 9 is a cross-section at 9-9 in FIG. 5.

FIG. 9 is a cross-section at 9-9 in FIG. 5. Pinion gear P1 has a meshing engagement with ring gear R2. Use of resilient member 602 allows the shift cams to rotate while the shift dog is still engaged with the teeth. The cams can rotate and compress the resilient member while the dog is engaged with the teeth and compressively loaded. When a bicycle rider pedals a bicycle, the torque input into the transmission is cyclic as the input shifts from one pedal to the other. Even for the very best cyclists, the input torque drops to zero or near zero during this transfer of input from one pedal the other. Due to the cyclic input loading of a pedaling bicycle rider, when the torque momentarily approaches or reaches zero, the force on the shift dog/tooth interface also drops to zero or near zero, it is at this moment that the shift dog will rotate out of engagement due to the resilient member's desire to return to a relaxed state. This gives the rider the impression of being able to shift under load while in actuality the shift occurs under near no load conditions.

Figure 10:
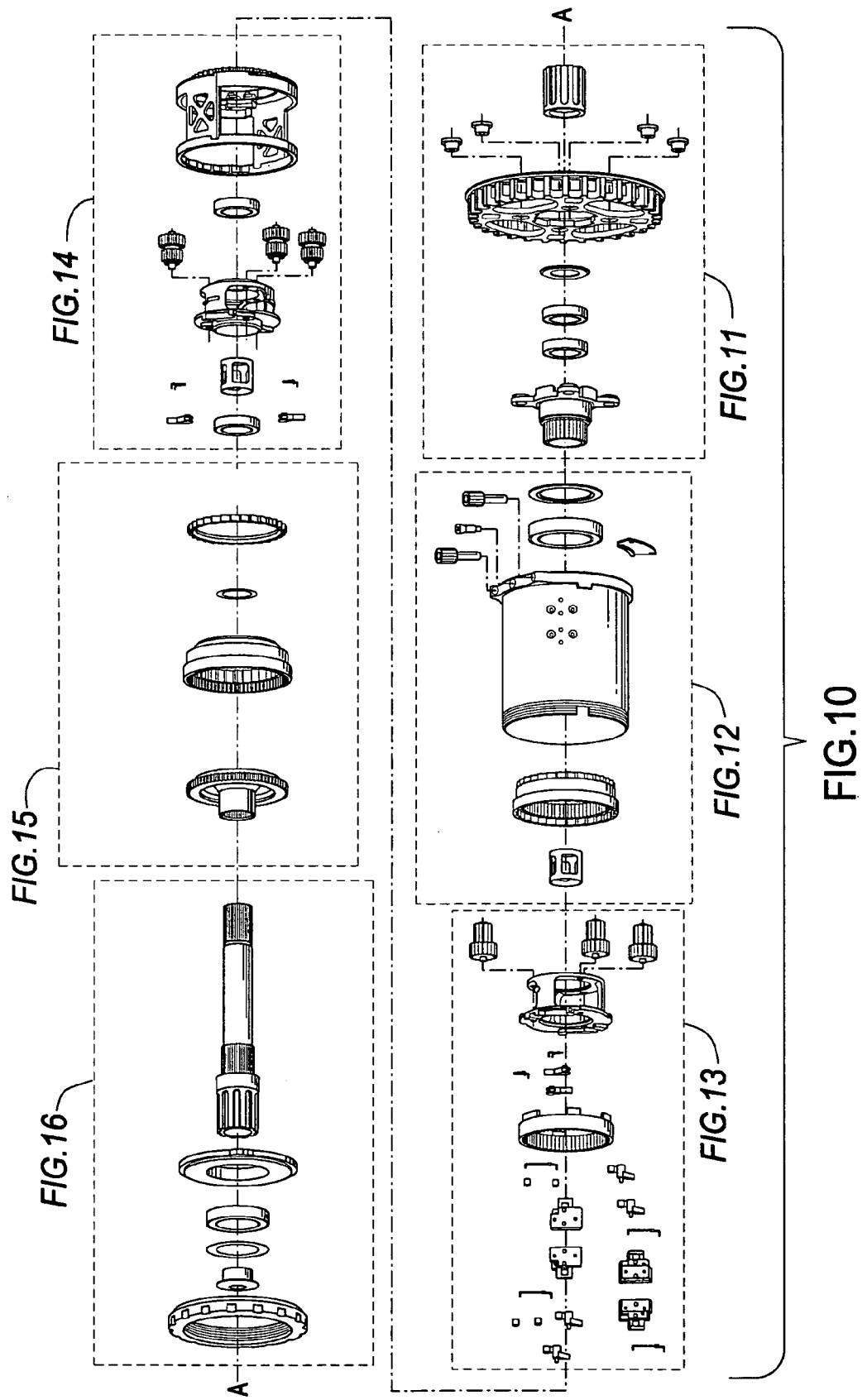
FIG. 10 is an exploded view of the transmission.
Figure 11:
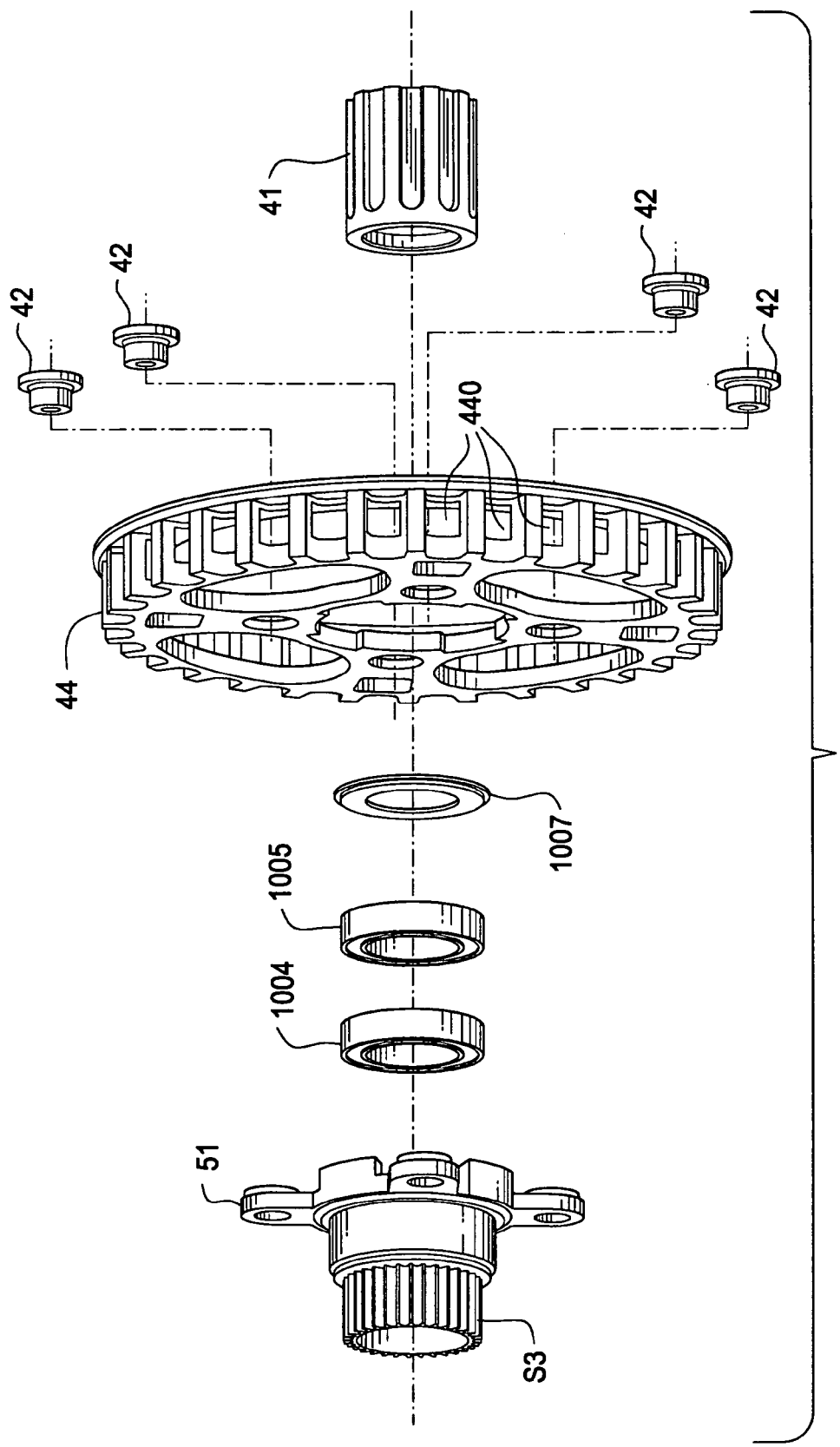
FIG. 11 is a detail of FIG. 10.

FIG. 10 is an exploded view of the transmission. Axis A-A is the axis of rotation. FIG. 11 is a detail of FIG. 10. A belt engages sprocket 44 and a rear hub 36, see FIG. 4. The rear three speed planetary gear transmission is disposed in the rear hub 36.

The transmission may be inserted into a bottom bracket 20 in a cartridge manner. Namely, the transmission is inserted into a cylindrical receiver, the cylindrical receiver comprising the bottom bracket 20. In an alternate embodiment, a seat stay, seat tube and chain stays can be attached directly to bracket 20, for example by welding, thereby making a transmission case of the bottom bracket. The internals for the transmission would not be changed for either embodiment.

Referring to FIG. 11 through FIG. 30. Sprocket 44 comprises holes 440 which receive belt teeth (not shown). Further, holes 440 allow dirt and debris thrown up by the wheels to drop through the sprocket, thereby allowing the sprocket 44 to be self cleaning. This prevents debris from accumulating between the belt and the sprocket which would otherwise hinder performance. Bushing 1007 engages bearings 1005.

Figure 12:
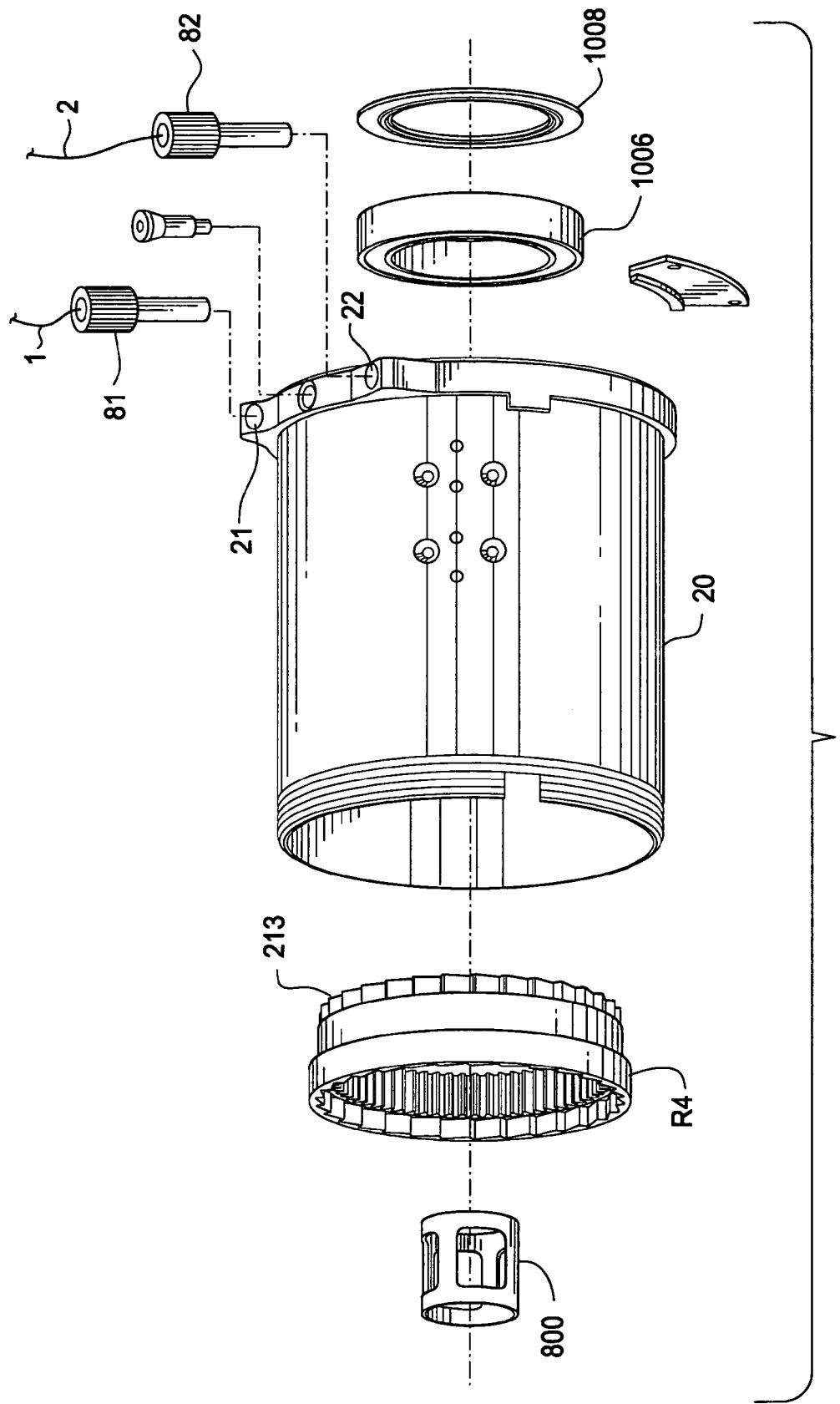
FIG. 12 is a detail of FIG. 10.

FIG. 12 is a detail of FIG. 10. Shift cables 1, 2 (known in the art) are connected to the transmission through adjusting grommets 81 and 82 respectively. Shift cables 1, 2 are typically connected to shift mechanisms on a bicycle handlebar for example (not shown). Grommets 81, 82 are threadably engaged with bracket 20 at hole 21, 22 respectively. Searing 1006 is disposed between sun gear S3 and bracket 20.

Spacer 800 is disposed between bearing 1004 and bearing 1003. Spacer 801 is disposed between bearing 1003 and bearing 1002. Nuts 42 attach sprocket 44 to a spider 51 on sun gear S3.

Figure 13:
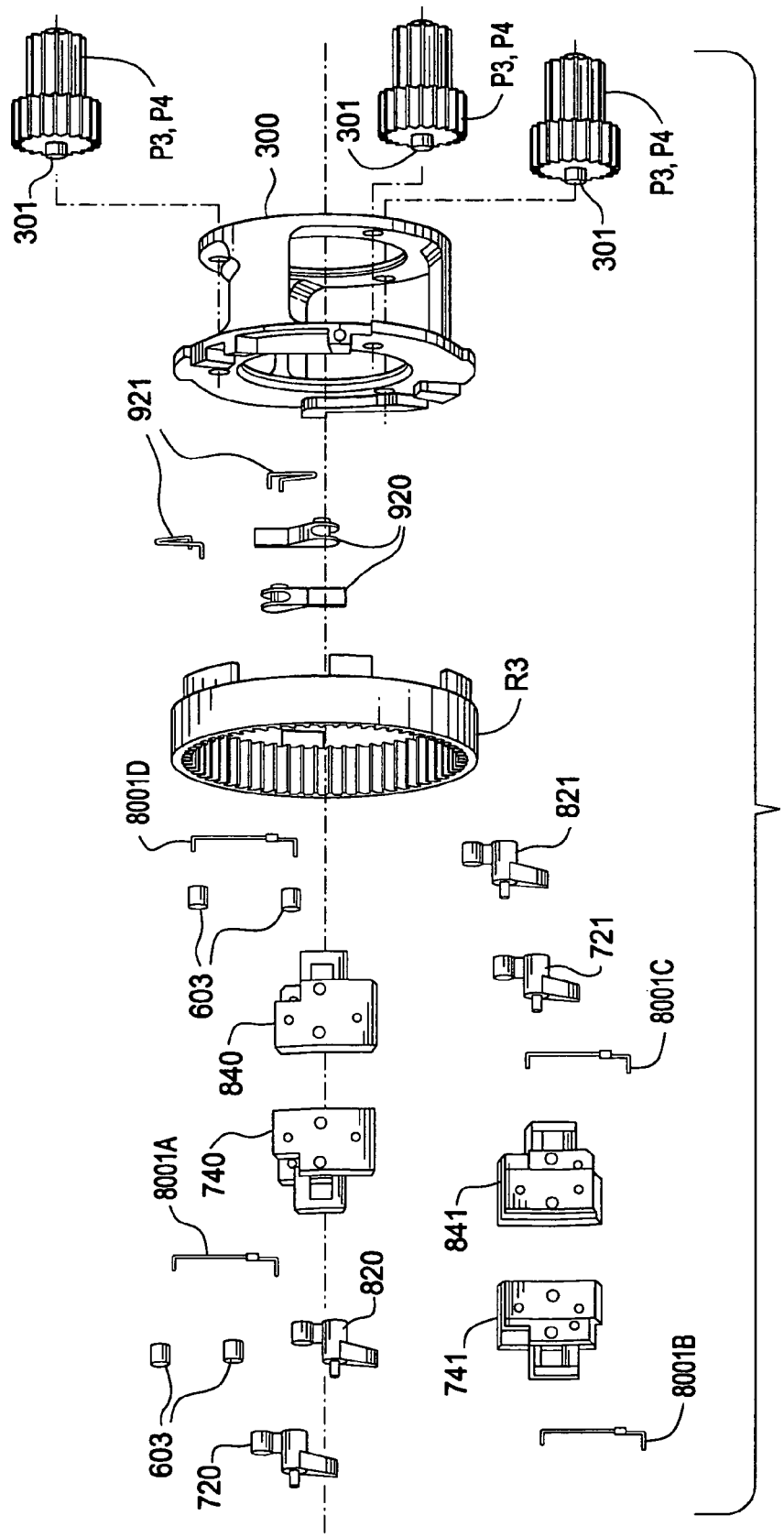
FIG. 13 is a detail of FIG. 10.
Figure 14:
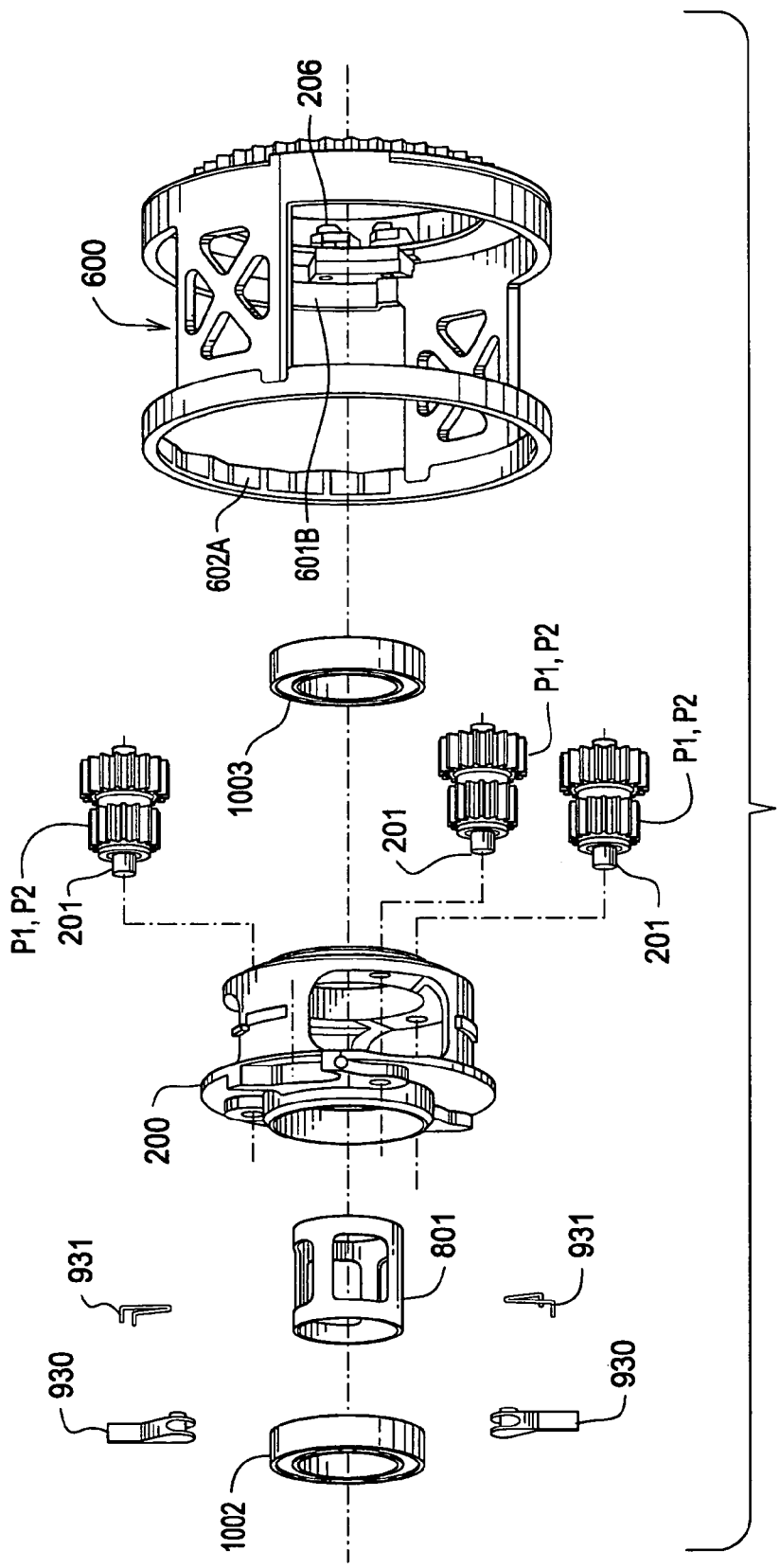
FIG. 14 is a detail of FIG. 10.

FIG. 13 is a detail of FIG. 10. FIG. 14 is a detail of FIG. 10. Each cable 1, 2 is fastened to receiver 206. Receiver 206 is fixed to an end of shift cam ring 600. By extending or retracting each cable 1, 2 the shift cam ring is thereby rotated within the transmission. The range of rotational movement of shift cam ring 600 is approximately 130°.

Shift dog 820 is pivotally mounted to a dog mount 840. Dog mount 840 is fastened to case 20 (not shown). A roller 603 is disposed between surface 601B and member 601. Spring 8001A biases shift dog 820 toward teeth 213.

Shift dog 720 is pivotally mounted to dog mount 740. Spring 8001A biases shift dog 720 toward teeth 212. A roller 603 is disposed between a surface 602A and a member 601.

Surface 602A engages roller 603 which engages compliant member 601 and thereby shift dog 720, 721. Surface 601B engages roller 603 which engages shift dogs 820, 821.

Shift dogs 720 and 721 engage teeth 212. Shift dogs 820, 821 engage teeth 213.

Springs 8001A, 8001B, 8001C, 8001D bias each shift dog 720, 721, 820, 821 into engagement with teeth 212, 213 respectively. Biasing the shift dogs causes the rollers 603 to maintain contact with cam surfaces 602A and 601B.

Figure 15:
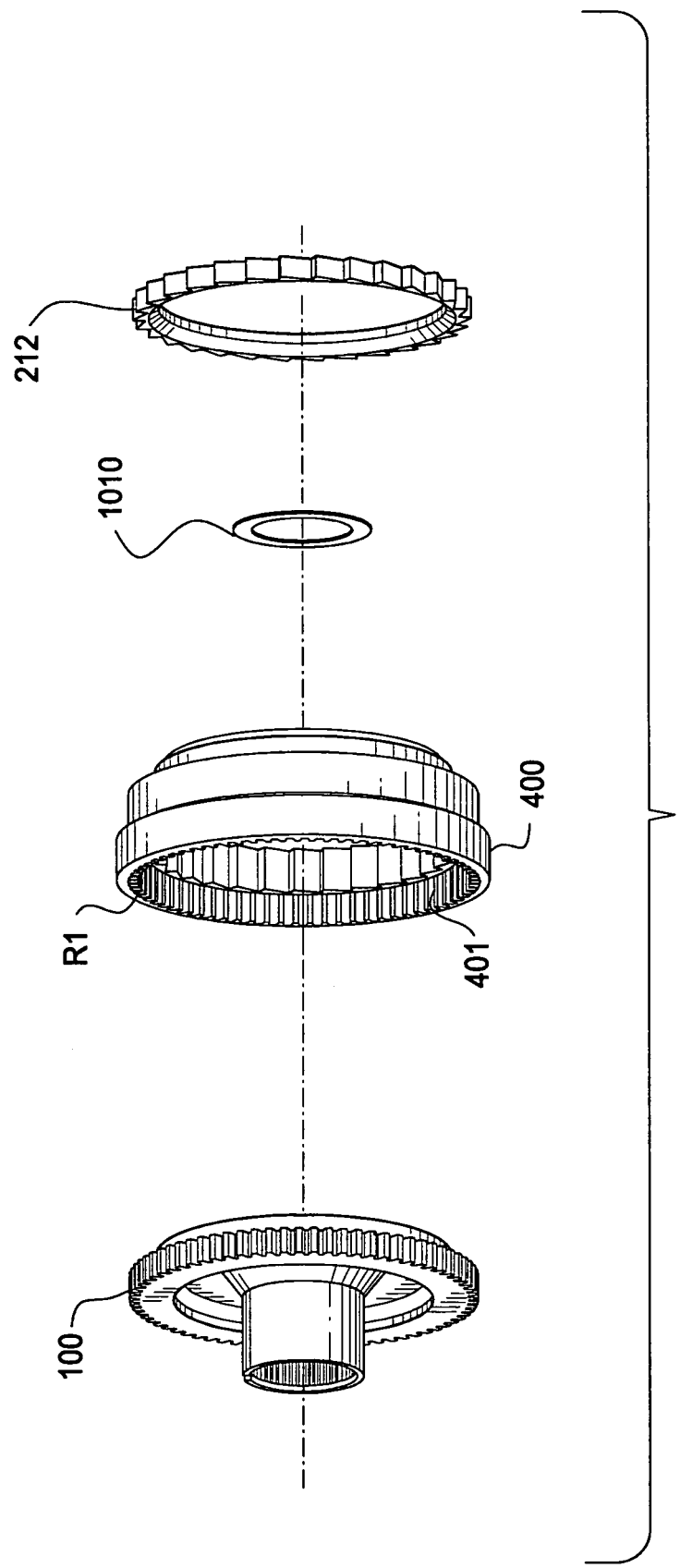
FIG. 15 is a detail of FIG. 10.

FIG. 15 is a detail of FIG. 10. Bushing 1010 engages bearing 1002. Member 100 engages shaft 22.

Figure 16:
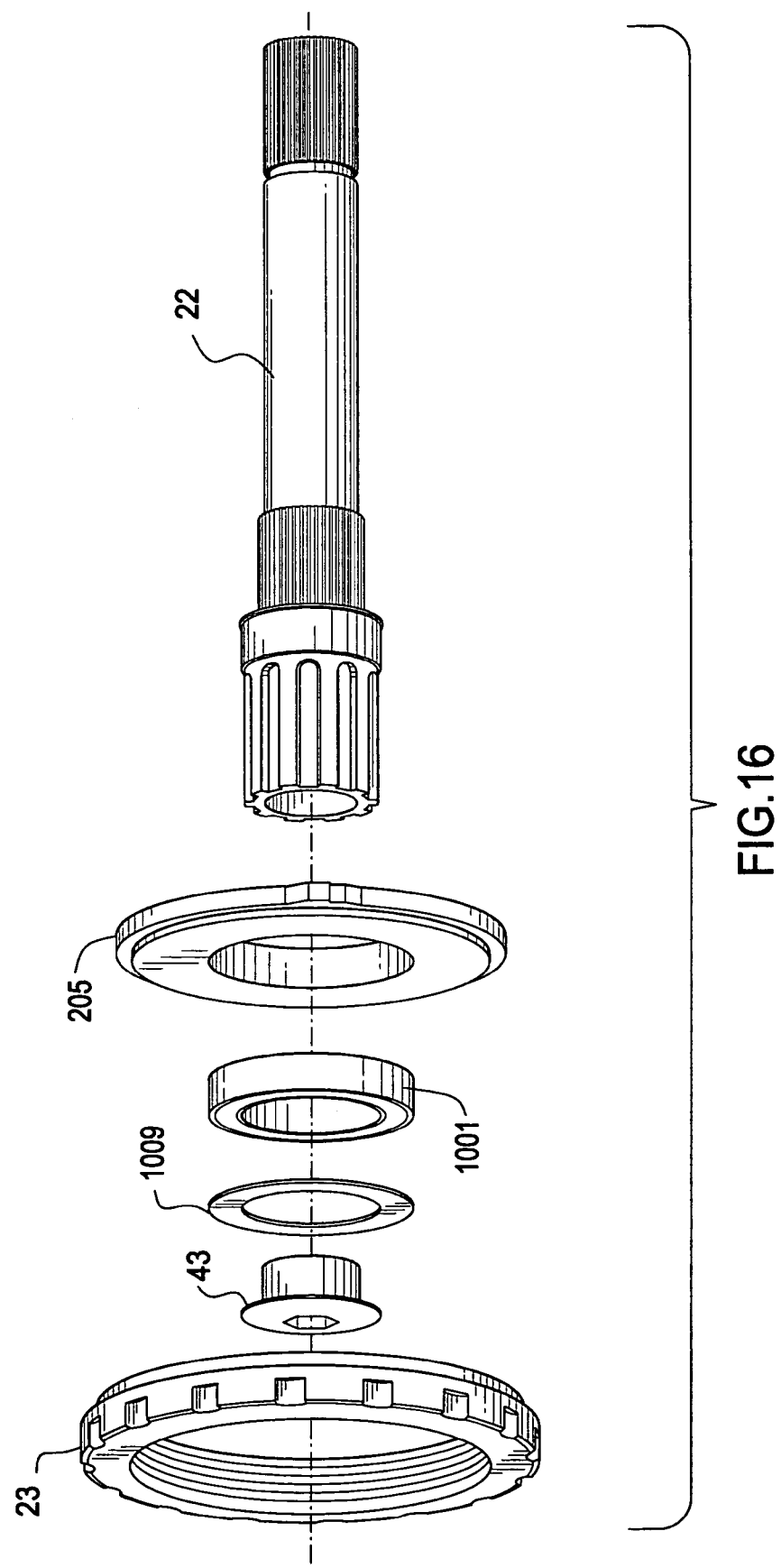
FIG. 16 is a detail of FIG. 10.

FIG. 16 is a detail of FIG. 10. Threaded ring 23 attaches end 205 to bracket 20. Bushing 1009 engages bearing 1001. Cap 43 retains crank arms (not shown) to shaft 22.

Figure 17:
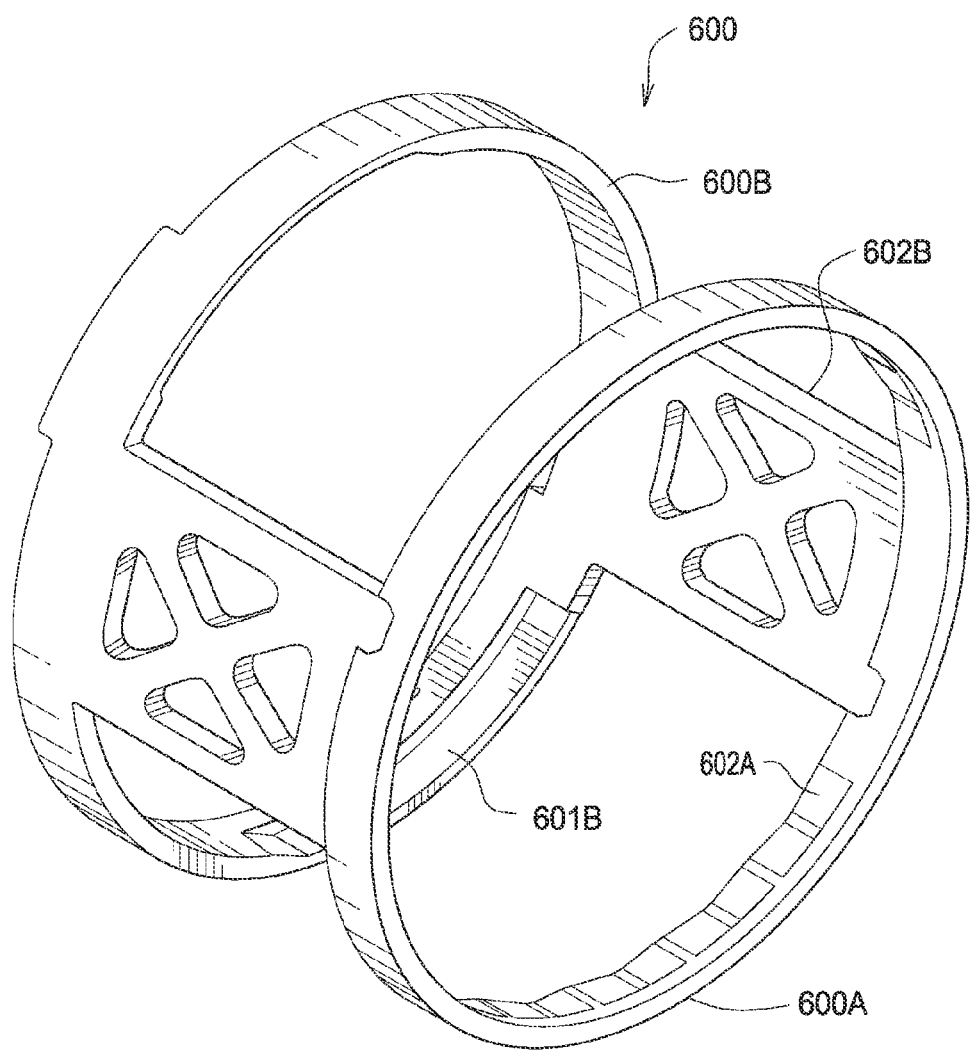
FIG. 17 is a perspective view of shift cam ring.

FIG. 17 is a perspective view of shift cam ring 600. Shift cam ring 600 comprises member 600A and 600B for ease of manufacture and assembly. Member 600A is cylindrical. Shift cam ring 600 is disposed in the transmission and is radially outermost from the member 100 and carrier 200 and within the bracket 20, see FIG. 5.

Figure 18:
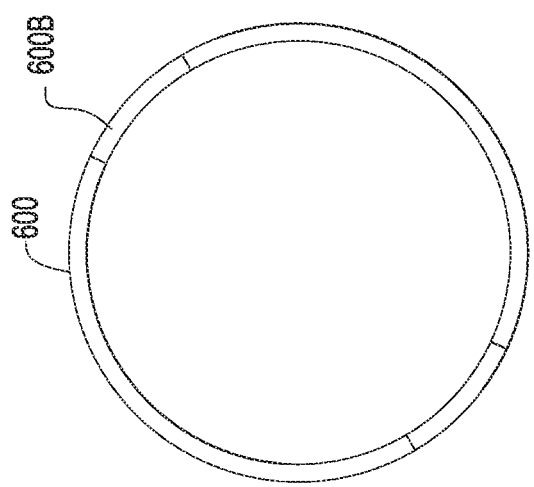
FIG. 18 is an end view of the shift cam ring.

FIG. 18 is an end view of the shift cam ring 600. Shift cam ring 600 is rotatable within bracket 20.

Figure 19:
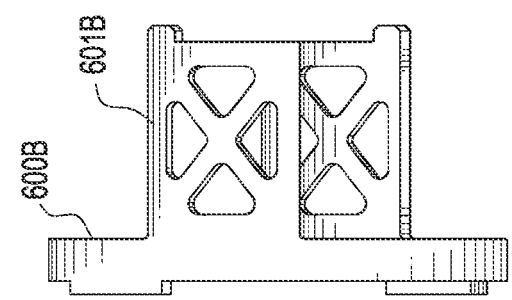
FIG. 19 is a side view of the shift cam ring.

FIG. 19 is an end view of shift cam ring 600.

Figure 20:
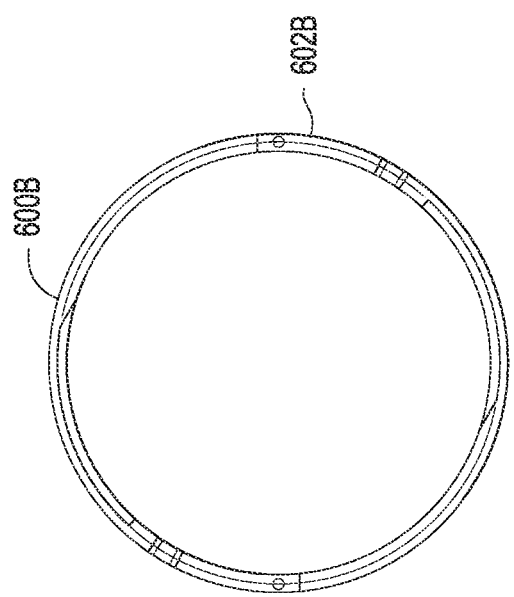
FIG. 20 is an end view of the shift cam ring.

FIG. 20 is an end view of shift cam ring 600. Each shift circumferential surface 601A and 602A is disposed at opposite ends of member 600A. Each surface 601A and 602A comprises a radially inward surface of the shift cam ring 600.

Circumferential surface 602A comprises a plurality of features each having a differing slope or radius. A radial position of rollers 603 engaging compliant member 601 and thereby shift dog 720 and 721 is each determined according to which surface of 602A is engaging rollers 603.

Circumferential surface 601B comprises a plurality of features each having a differing slope or radius. A radial position of rollers 603 engaging compliant member 601 and thereby shift dog 820 and 821 is each determined according to which surface of 601B is engaging rollers 603. 602. Each surface 603A and 601B comprises a radially inward surface of the shift cam ring 600.

Member 600B is cylindrical.

Figure 21:
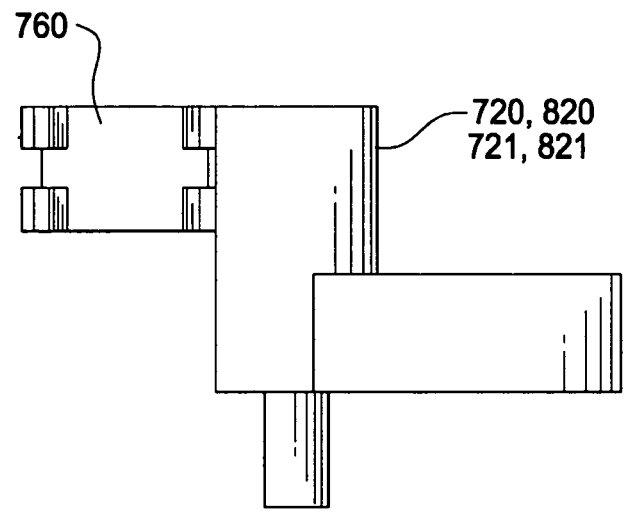
FIG. 21 is a plan view of a shift dog.

FIG. 21 is a plan view of a shift dog. Receiving portion 760 receives a member 601. Each shift dog 720, 820, 721, 821 is identical to the others. For each shift dog 720, 820, 721 and 821 a member 601 is fixed to portion 760.

Figure 22:
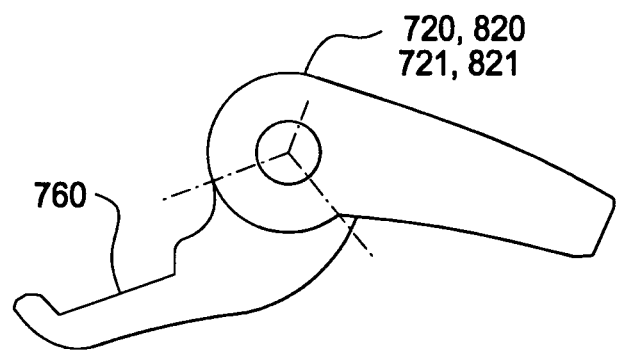
FIG. 22 is a side view of a shift dog.

FIG. 22 is a side view of a shift dog. Receiving portion 760 receives a member 601.

Figure 23:
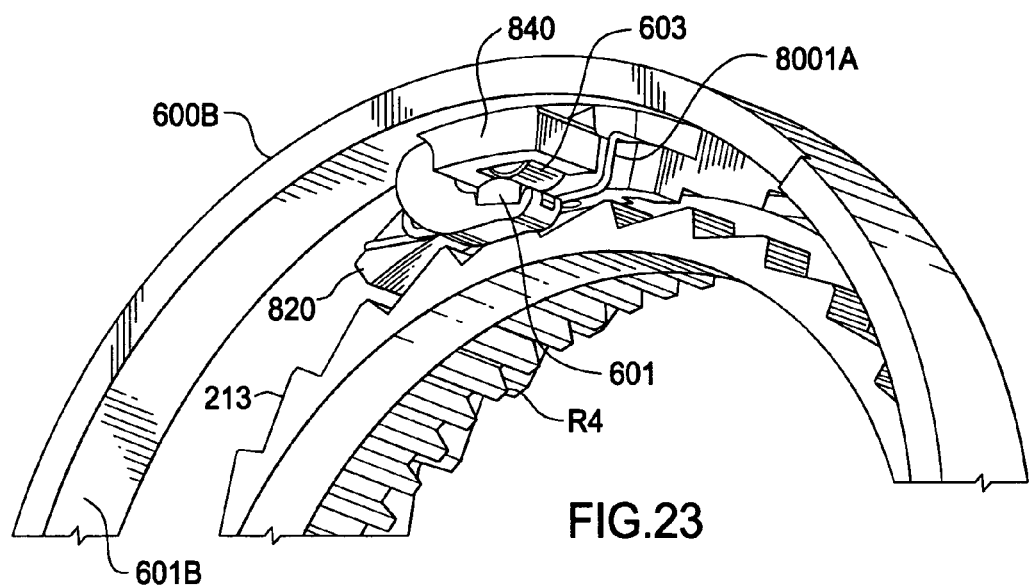
FIG. 23 is a perspective view of a shift dog.

FIG. 23 is a perspective view of a shift dog. Shift dog 820 is pivotally mounted to a dog mount 840. Dog mount 840 is fastened to bracket 20 (not shown). A roller 603 is disposed between surface 601B and member 601.

Figure 24:
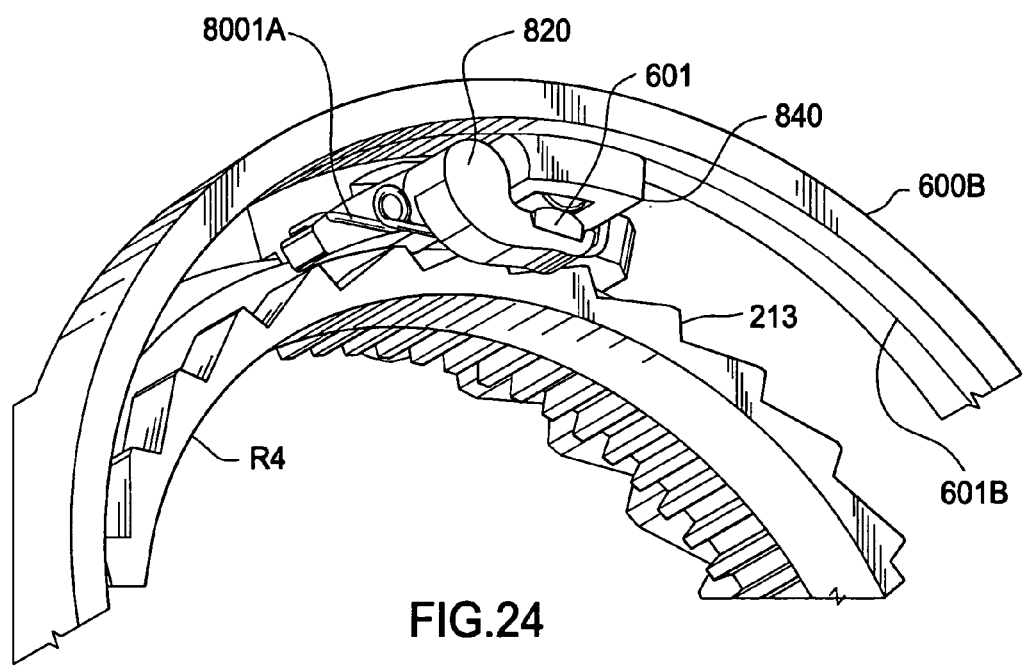
FIG. 24 is a perspective view of a shift dog.

FIG. 24 is a perspective view of a shift dog. Spring 8001A biases shift dog 820 toward teeth 213.

FIG. 24 is a perspective view of a shift dog. Shift dog 840 is fastened to bracket 20.

Figure 25:
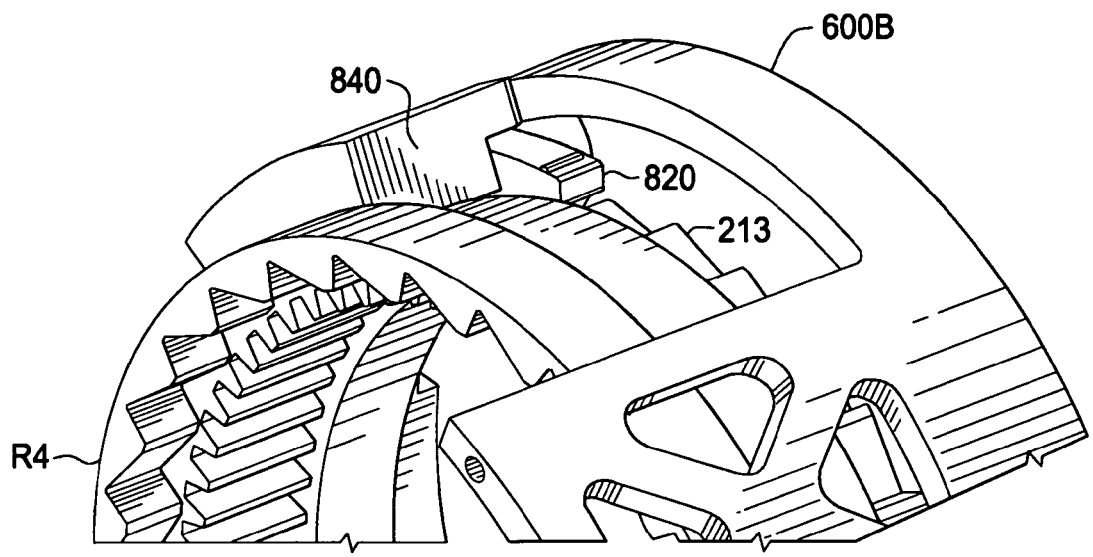
FIG. 25 is a perspective view of a shift dog.

FIG. 25 is a perspective view of a shift dog. Shift dog 820 is pivotally mounted to dog mount 840. Shift dog 820 engages teeth 213.

Figure 26:
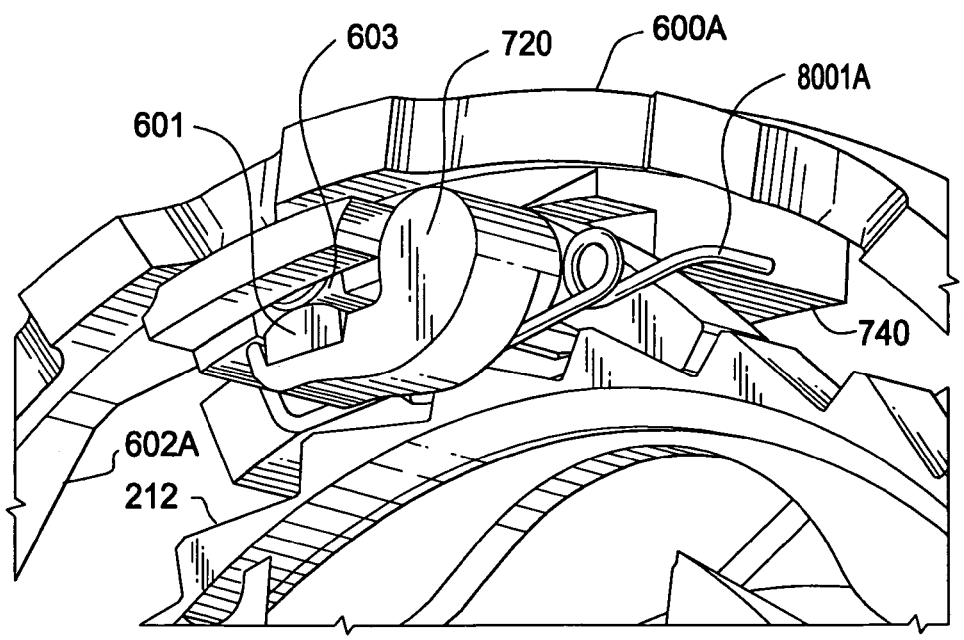
FIG. 26 is a perspective view of a shift dog.

FIG. 26 is a perspective view of a shift dog. Shift dog 720 is pivotally mounted to dog mount 740. Shift dog 720 engages teeth 212. Dog mount 740 is fastened to bracket 20. Spring 8001B biases shift dog 720 against teeth 212.

Figure 27:
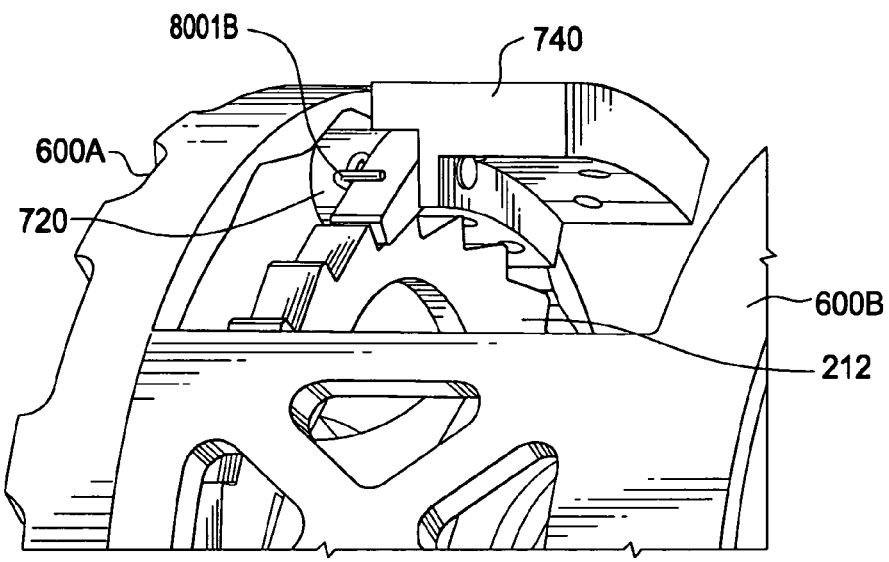
FIG. 27 is a perspective view of a shift dog.

FIG. 27 is a perspective view of a shift dog.

Figure 28:
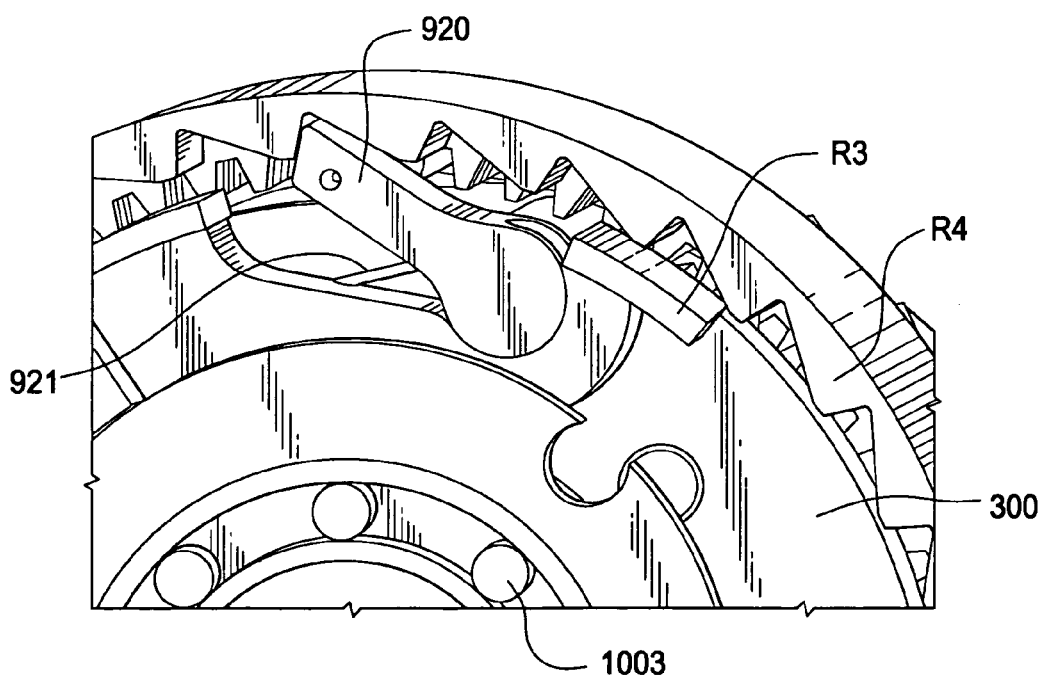
FIG. 28 is a perspective view of a clutch.

FIG. 28 is a detail of a one-way clutch dog. One way clutch dog 920 is pivotally mounted to carrier 300. Spring 921 biases one way clutch dog 920 against teeth of ring gear R4. One way clutch dog 920 allows a reverse rotational movement of ring gear R4 by disengaging ring gear teeth. Depending upon the particular gear that is engaged, the one way clutch is the "free wheel" feature of the transmission which allows a rider to stop pedaling and coast. A second identical one way clutch dog is disposed opposite that shown in FIG. 28, thereby forming a pair of one way clutch shift dogs.

Figure 29:
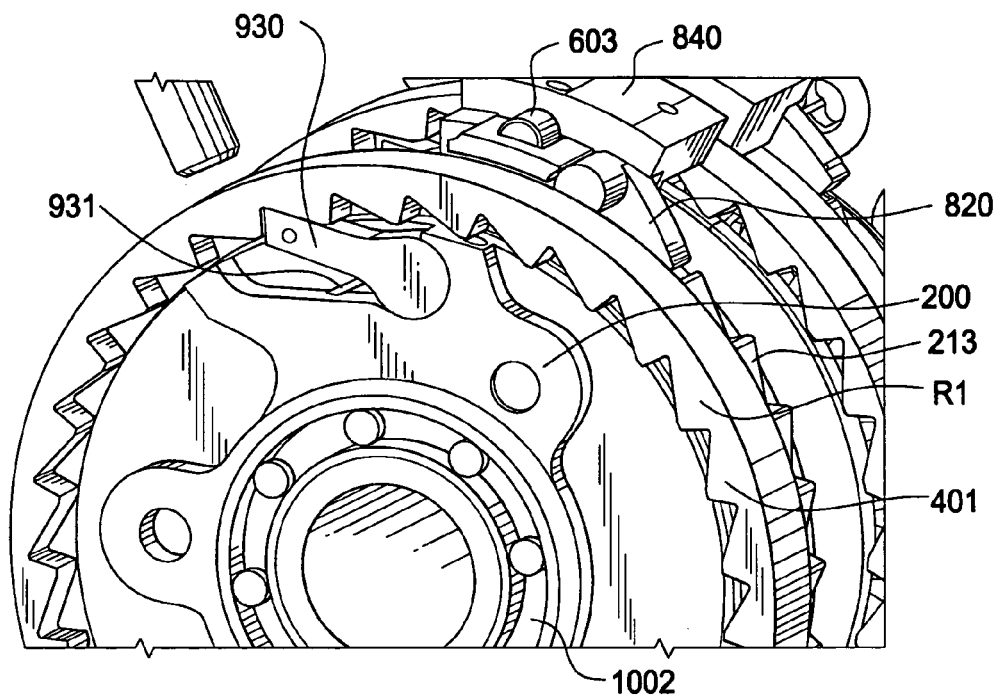
FIG. 29 is a perspective view of a clutch.

FIG. 29 is a detail of a one-way clutch dog. One way clutch dog 930 is pivotally mounted to carrier 200. Spring 931 biases one way clutch dog 930 against teeth 401 of ring gear R1. One way clutch dog 930 prevents a reverse rotational movement of ring gear R1 by engaging teeth 401. One way clutch dog 930 allows a forward rotational movement of ring gear R1 relative to carrier 200 by disengaging from teeth 401. Depending upon the particular gear that is engaged, the one way clutch is the "free wheel" feature of the transmission which allows a rider to stop pedaling and coast. A second identical one way clutch dog is disposed opposite that shown in FIG. 38, thereby forming a pair of one way clutch shift dogs.

Figure 30:
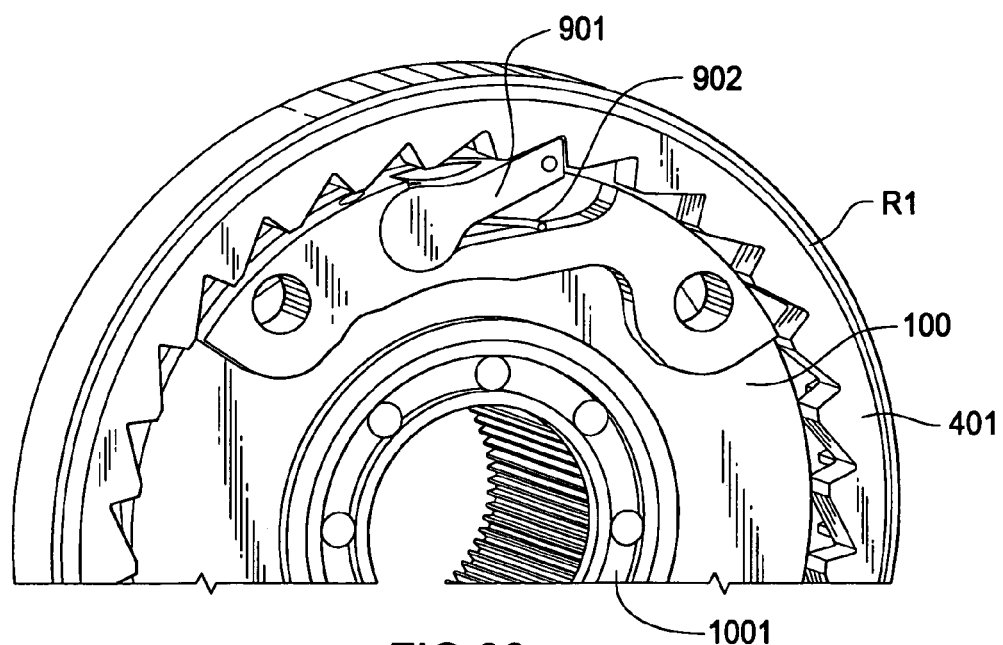
FIG. 30 is a perspective view of a clutch.

FIG. 30 is a detail of a one-way clutch dog. One way clutch dog 901 is pivotally mounted to carrier 100. Spring 902 biases one way clutch dog 901 against teeth 401 of ring gear R1. One way clutch dog 901 allows forward rotational movement of ring gear R1 relative to carrier 100 by disengaging teeth 401. One way clutch dog 901 prevents a reverse rotational movement of ring gear R1 by engaging teeth 401. Depending upon the particular gear that is engaged, the one way clutch is the "free wheel" feature of the transmission which allows a rider to stop pedaling and coast. A second, identical one way clutch dog is disposed opposite that shown in FIG. 39, thereby forming a pair of one way clutch shift dogs.

Although a form of the invention has been described herein, it will be obvious to those skilled in the art that variations may be made in the construction and relation of parts without departing from the spirit and scope of the invention described herein.

We claim:

1. A bicycle comprising:
   a frame and at least one wheel attached to the frame;
   the frame further comprising a receiver;
   a first planetary gear transmission disposed in the receiver, the first planetary gear transmission comprising;
   an input member (100) connected to a ring gear (400);
   the ring gear (400) comprising a ring gear (R1) and a ring gear (R2), ring gear (400) in meshing engagement to a pinion gear (P1);
   pinion gear (P1) and a pinion gear (P2) journalled to a first carrier shaft (201), a first carrier (200) engaged with a first brake (brake 1), a one-way clutch (CL1) disposed between the first carrier (200) and the ring gear (400);
   a pinion gear (P2) in meshing engagement with a ring gear (R3);
   a ring gear (R3) connected to a second carrier (300);
   a third pinion (P3) and a fourth pinion (P4) journalled to the second carrier (300);
   the third pinion (P3) in meshing engagement with a ring gear (R4), ring gear (R4) engaged with a second brake (brake 2), a second one-way clutch (CL2) disposed between the ring gear (R4) and the ring gear (R3);
   the fourth pinion (P4) in meshing engagement with an output sprocket (S3);
   the wheel having a hub;
   a second planetary gear transmission disposed in the hub; and
   a belt for transmitting a torque trained between the first planetary gear transmission output sprocket and the second planetary gear transmission.

2. The bicycle as in claim 1, wherein the first planetary gear transmission comprises four speeds.

3. The bicycle as in claim 1, wherein the second planetary gear transmission comprises three speeds.

4. The bicycle as in claim 1, wherein the endless member comprises a chain.

5. The bicycle as in claim 1, wherein the receiver is disposed in a frame bottom bracket.

6. A belt drive system for a bicycle comprising:
   a frame comprising a receiver;
   a first planetary gear transmission disposable in the receiver, the first planetary gear transmission comprising;

an input member (100) connected to a ring gear (400);

the ring gear (400) comprising a ring gear (R1) and a ring gear (R2), ring gear (400) in meshing engagement to a pinion gear (P1);

pinion gear (P1) and a pinion gear (P2) journalled to a first carrier shaft (201), a first carrier (200) engaged with a first brake (brake 1), a one-way clutch (CL1) disposed between the first carrier (200) and the ring gear (400);

a pinion gear (P2) in meshing engagement with a ring gear (R3);

a ring gear (R3) connected to a second carrier shaft (301);

a third pinion (P3) and a fourth pinion (P4) journalled to a second carrier (300);

the third pinion (P3) in meshing engagement with a ring gear (R4), ring gear (R4) engaged with a second brake (brake 2), a second one-way clutch (CL2) disposed between the ring gear (R4) and the ring gear (R3);

the fourth pinion (P4) in meshing engagement with an output sprocket (S3);

a wheel engagable with the frame, the wheel having a hub;

a second planetary gear transmission disposed in the hub; and an endless member for transmitting a torque trainable between the first planetary gear transmission output sprocket and the second planetary gear transmission.

7. The system as in claim 6, wherein the first planetary gear transmission comprises four speeds.

8. The system as in claim 6, wherein the second planetary gear transmission comprises three speeds.

9. A belt drive system comprising:

a first planetary gear transmission mountable in a first receiver comprising;

an input member (100) connected to a ring gear (400);

the ring gear (400) comprising a ring gear (R1) and a ring gear (R2), ring gear (R2) in meshing engagement to a pinion gear (P1);

pinion gear (P1) and a pinion gear (P2) journalled to a first carrier shaft (201), a first carrier (200) engaged with a first brake (brake 1), a one-way clutch (CL1) disposed between the first carrier (200) and the ring gear (400);

a pinion gear (P2) in meshing engagement with a ring gear (R3);

a ring gear (R3) connected to a second carrier (300);

a third pinion (P3) and a fourth pinion (P4) journalled to the second carrier (300);

the third pinion (P3) in meshing engagement with a ring gear (R4), ring gear (R4) engaged with a second brake (brake 2), a second one-way clutch (CL2) disposed between the ring gear (R4) and the ring gear (R3);

the fourth pinion (P4) in meshing engagement with an output sprocket (S3);

a second planetary gear transmission mountable in a second receiver; and an endless belt member for transmitting a torque trainable between the first planetary gear transmission output sprocket and the second planetary gear transmission.

10. The system as in claim 9, wherein the first planetary gear transmission comprises four speeds.

11. The system as in claim 10, wherein the second planetary gear transmission comprises three speeds.

* * * * *